(12) United States Patent
Okuyama et al.

(10) Patent No.: US 12,057,082 B2
(45) Date of Patent: Aug. 6, 2024

(54) ELECTRONIC APPARATUS

(71) Applicant: Japan Display Inc., Tokyo (JP)

(72) Inventors: Kentaro Okuyama, Tokyo (JP); Chiharu Kaburagi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/338,409

(22) Filed: Jun. 21, 2023

(65) Prior Publication Data

US 2023/0410760 A1    Dec. 21, 2023

(30) Foreign Application Priority Data

Jun. 21, 2022    (JP) ................. 2022-099807

(51) Int. Cl.
*G09G 3/36* (2006.01)
*G06F 3/01* (2006.01)
*G06V 40/19* (2022.01)

(52) U.S. Cl.
CPC .......... *G09G 3/3607* (2013.01); *G06F 3/013* (2013.01); *G06V 40/19* (2022.01); *G09G 3/3677* (2013.01); *G09G 2310/08* (2013.01); *G09G 2360/141* (2013.01)

(58) Field of Classification Search
CPC .............. G09G 3/3607; G09G 3/3677; G09G 2310/08; G09G 2360/141; G06F 3/013; G06V 40/19
See application file for complete search history.

(56) References Cited

U.S. PATENT DOCUMENTS

| | | | |
|---|---|---|---|
| 8,072,481 B1 * | 12/2011 | McNelley | H04N 7/142 348/14.08 |
| 8,576,325 B2 * | 11/2013 | Dudek | H04N 7/144 348/344 |
| 9,055,188 B2 * | 6/2015 | Hojer | H04N 7/144 |
| 9,392,219 B2 * | 7/2016 | Robinson | G09G 3/3406 |
| 9,756,257 B2 * | 9/2017 | Tan | G06F 3/013 |
| 10,042,445 B1 * | 8/2018 | Boelter | G06F 3/04845 |
| 10,136,295 B1 * | 11/2018 | Chee | H04L 67/125 |
| 10,178,343 B2 * | 1/2019 | Lewis | G07F 9/0235 |
| 10,623,698 B2 * | 4/2020 | Liu | G06T 7/73 |
| 10,645,340 B2 * | 5/2020 | Liu | H04N 7/144 |
| 10,701,313 B2 * | 6/2020 | Liu | H04N 7/144 |
| 10,819,948 B2 * | 10/2020 | Liu | H04N 21/44218 |
| 10,838,468 B2 * | 11/2020 | Bikumala | G06F 1/1637 |
| 10,911,656 B2 * | 2/2021 | McMillan | H04N 7/142 |

(Continued)

FOREIGN PATENT DOCUMENTS

JP    2015-518580 A    7/2015
WO    2013/154295 A1    10/2013

*Primary Examiner* — Dmitriy Bolotin
(74) *Attorney, Agent, or Firm* — XSENSUS LLP

(57) ABSTRACT

According to one embodiment, an electronic apparatus includes a display panel including a display area, a camera opposed to the display area of the display panel, and a controller that controls drive of the display panel and drive of the camera, the controller compares a position of an image of an eye of a user displayed in the display area and a position of the camera, and moves, in a case where difference is present between the position of the image of the eye of the user and the position of the camera, an image of the user such that the position of the image of the eye of the user is superposed on the position of the camera.

4 Claims, 14 Drawing Sheets

(56) References Cited

U.S. PATENT DOCUMENTS

| | | | |
|---|---|---|---|
| 10,972,699 B2* | 4/2021 | Liu | G06T 7/73 |
| 11,336,833 B1* | 5/2022 | Cutler | G06T 7/70 |
| 2005/0024484 A1* | 2/2005 | Leonard | H04N 7/142 |
| | | | 348/E7.083 |
| 2008/0297587 A1* | 12/2008 | Kurtz | G06V 40/20 |
| | | | 348/E7.083 |
| 2009/0102763 A1* | 4/2009 | Border | H04N 7/144 |
| | | | 345/87 |
| 2009/0278913 A1* | 11/2009 | Rosenfeld | H04N 7/144 |
| | | | 348/E7.083 |
| 2010/0064259 A1* | 3/2010 | Alexanderovitc | G06F 3/04815 |
| | | | 715/852 |
| 2017/0264865 A1* | 9/2017 | Huangfu | H10K 50/818 |
| 2018/0102077 A1* | 4/2018 | Lin | H04N 13/363 |
| 2019/0325835 A1* | 10/2019 | Ozaki | G09G 3/3413 |
| 2021/0044756 A1* | 2/2021 | Kimura | G09F 9/00 |
| 2022/0247971 A1* | 8/2022 | McNelley | H04N 7/144 |
| 2023/0377302 A1* | 11/2023 | Haller | G06V 10/141 |

\* cited by examiner

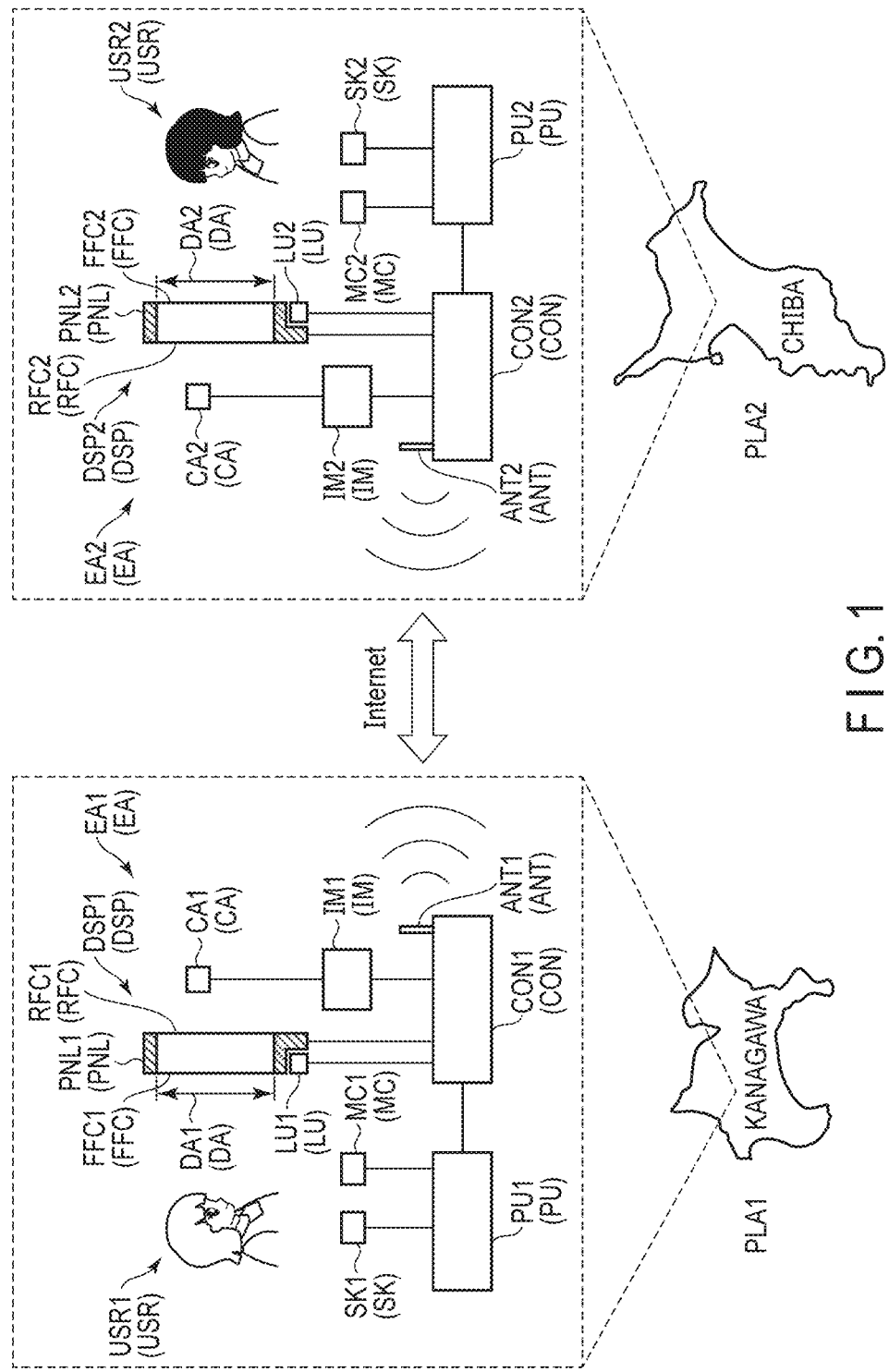
F I G. 1

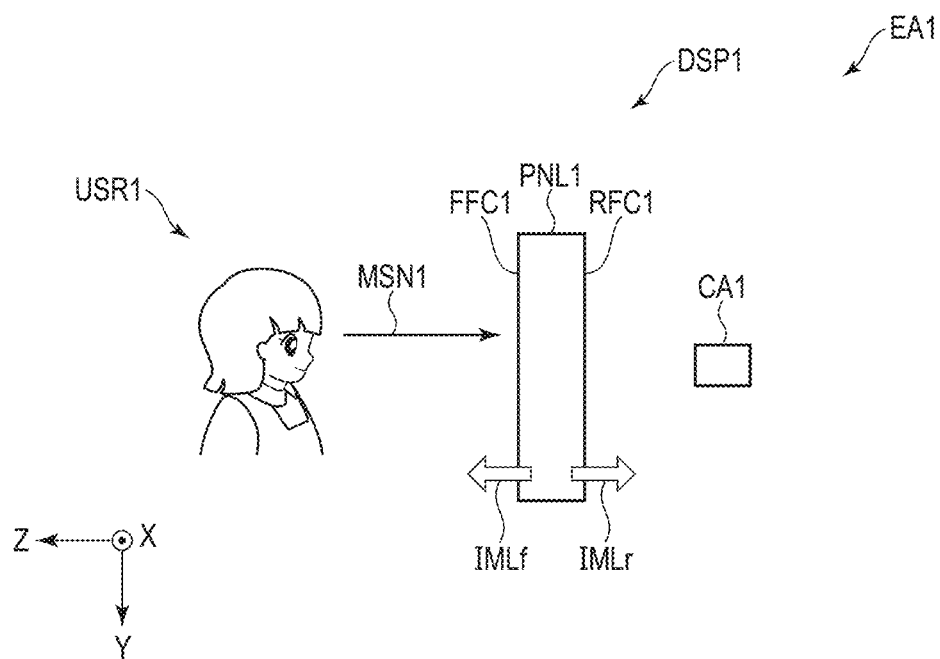
F I G. 2
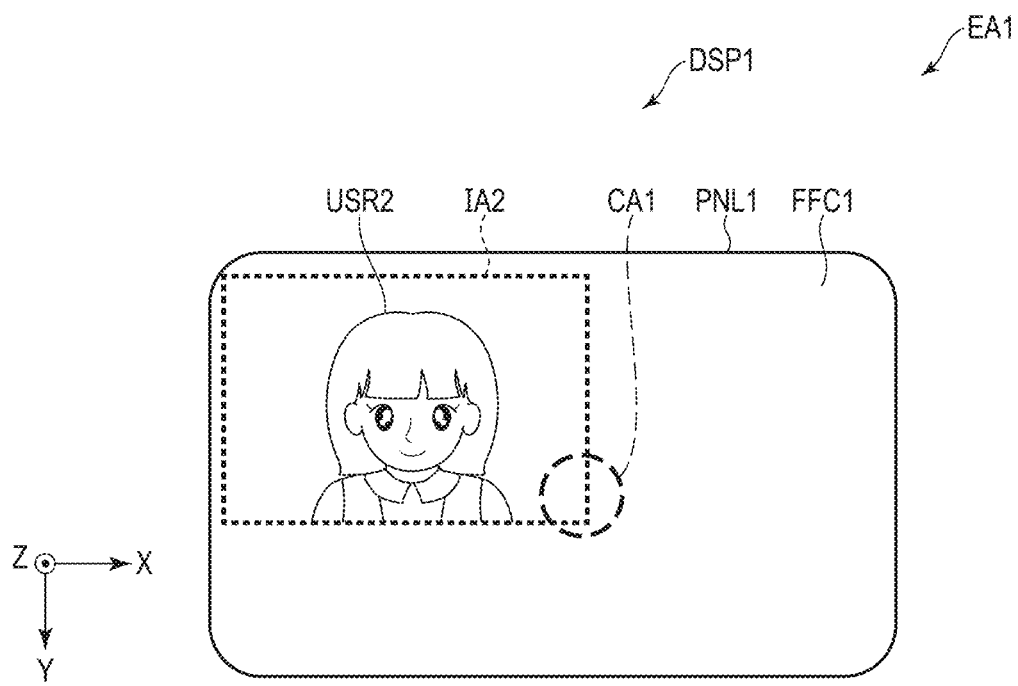
F I G. 3

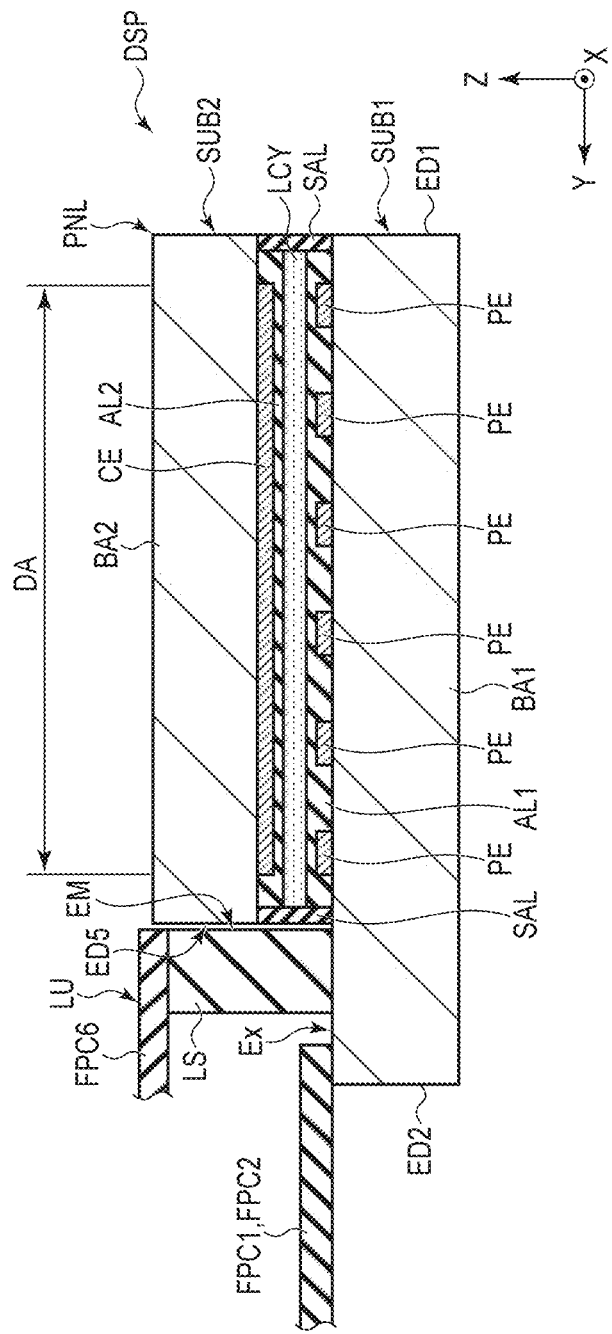
F I G. 9

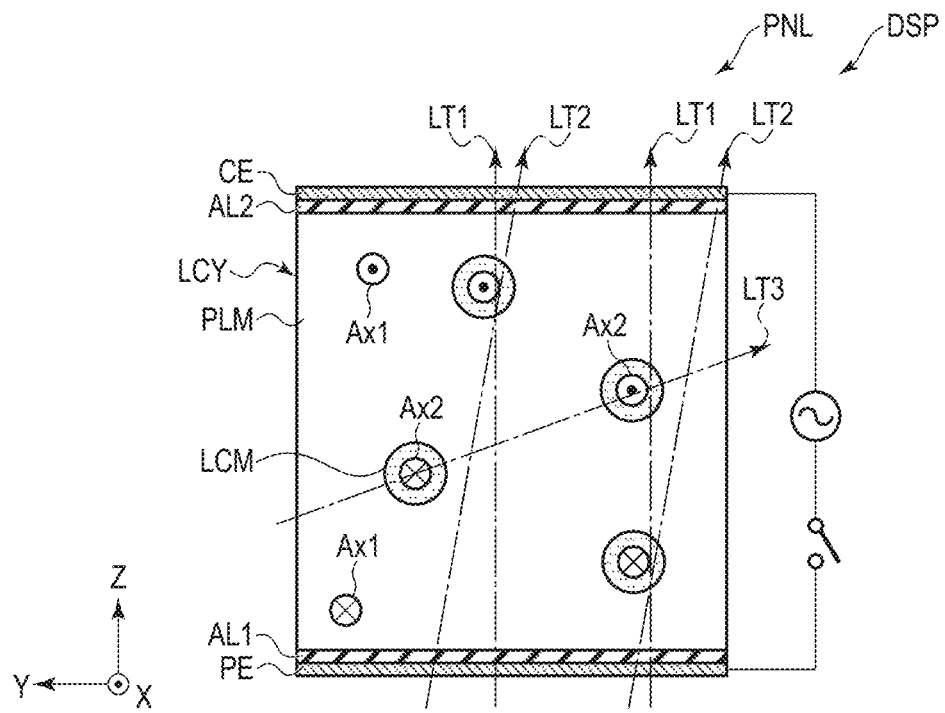
F I G. 11
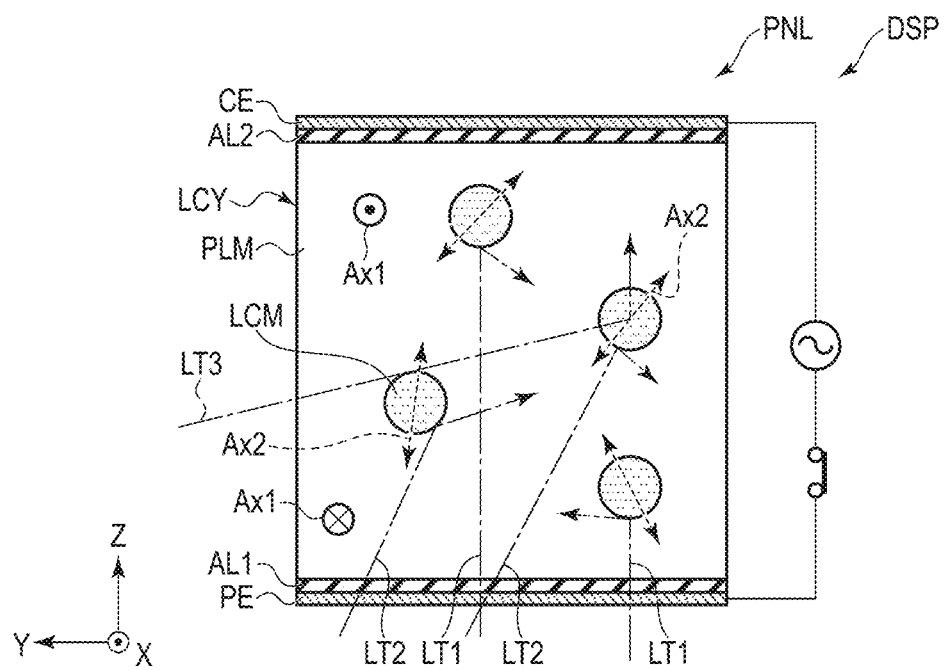
F I G. 12

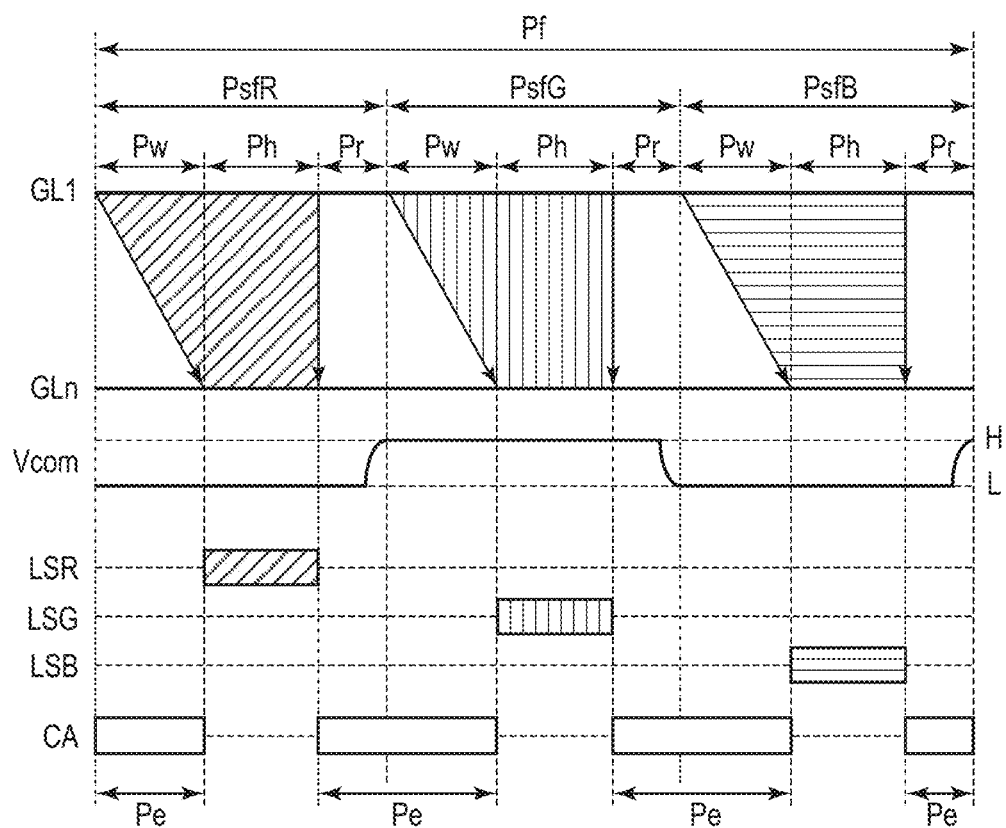
F I G. 23

ELECTRONIC APPARATUS

CROSS-REFERENCE TO RELATED APPLICATIONS

This application is based upon and claims the benefit of priority from Japanese Patent Application No. 2022-099807, filed Jun. 21, 2022, the entire contents of which are incorporated herein by reference.

FIELD

Embodiments described herein relate generally to an electronic apparatus.

BACKGROUND

A transparent display device has been developed that includes a transparent display and a sensor that detects the position of an object and the position of a user. The transparent display device determines an area in which the object is visible by the user in a transmissive manner, based on the position of the object and the position of the user detected by the sensor, and displays information on the transparent display, based on the area.

BRIEF DESCRIPTION OF THE DRAWINGS

FIG. 1 is a block diagram showing an electronic apparatus according to an embodiment.

FIG. 2 is a block diagram showing the positional relationship between a user, a display panel, and a camera.

FIG. 3 illustrates the positional relationship between the display panel and the camera viewed from the user.

FIG. 9 is a sectional view of the display device shown in FIG. 8.

FIG. 11 is a schematic view showing a liquid crystal layer in a transparent state.

FIG. 12 is a schematic view showing the liquid crystal layer in a scattered state.

FIG. 23 is a timing chart for describing an exemplary operation of the electronic apparatus.

DETAILED DESCRIPTION

Figure 4:
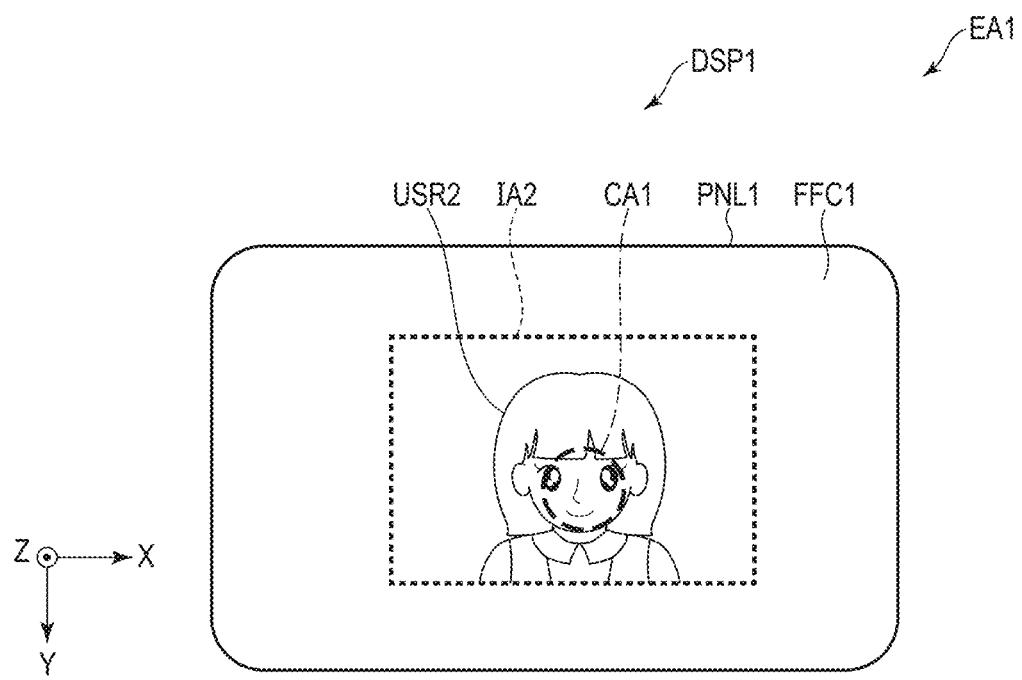
FIG. 4 illustrates a positional relationship between a user displayed on the display panel and the camera.

In general, according to one embodiment, an electronic apparatus comprises
 a display panel including a display area;
 a camera opposed to the display area of the display panel; and
 a controller that controls drive of the display panel and drive of the camera,
 the controller
 comparing a position of an image of an eye of a user displayed in the display area and a position of the camera, and
 moving, in a case where difference is present between the position of the image of the eye of the user and the position of the camera, an image of the user such that the position of the image of the eye of the user is superposed on the position of the camera.

An object of the present embodiment is to provide an electronic apparatus enabling users to keep eye contact with each other in an online meeting.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, similar elements to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of an electronic device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. The first direction X, the second direction Y, and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the electronic device on a tip side of the arrow in the third direction Z. Here, viewing from this observation position toward the X-Y plane defined by the first direction X and the second direction Y is referred to as plan view. Viewing a cross-section of the electronic device in the X-Z plane defined by the first direction X and the third direction Z or in the Y-Z plane defined by the second direction Y and the third direction Z is referred to as cross-sectional view.

Embodiment

FIG. 1 is a block diagram showing an electronic apparatus according to an embodiment. In the example shown in FIG. 1, two users USR1 and USR2 are in an online meeting at different places PLA1 and PLA2, respectively. Referring to FIG. 1, KANAGAWA and CHIBA are given as examples of the places PLA1 and PLA2, but the present embodiment is not limited to this. The places PLA1 and PLA2 may be two adjacent rooms or two different countries. The distance between the places PLA1 and PLA2 is not limited to the example shown in FIG. 1.

The users USR1 and USR2 are in the online meeting with electronic apparatuses EA1 and EA2, respectively. The electronic apparatuses EA1 and EA2 are each referred to as an electronic apparatus EA unless otherwise distinguished. Such an electronic apparatus EA includes a display panel PNL, a light source unit LU, a camera CA, an imaging circuit IM, a controller CON, a processing unit PU, a microphone MC, a speaker SK, and an antenna ANT.

More particularly, the electronic apparatus EA1 includes a display panel PNL1, a light source unit LU1, a camera CA1, an imaging circuit IM1, a controller CON1, a processing unit PU1, a microphone MC1, a speaker SK1, and an antenna ANT1.

The electronic apparatus EA2 includes a display panel PNL2, a light source unit LU2, a camera CA2, an imaging circuit IM2, a controller CON2, a processing unit PU2, a microphone MC2, a speaker SK2, and an antenna ANT2.

The display panel PNL is a transparent display and includes a display area DA in which an image can be displayed and through which external light can be transmitted. The display panel PNL displays an image on each of a face FFC (FFC1 or FFC2) closer to the user USR and a face RFC (RFC1 or RFC2) opposite thereto, though to be described in detail below. Referring to FIG. 1, the display panel PNL except the display area DA is given hatching.

The light source unit LU is located outside an area opposed to the display area DA of the display panel PNL. In other words, the light source unit LU is provided adjacently to a side surface of the display panel PNL. The display panel PNL and the light source unit LU are each connected to the controller CON.

The camera CA is opposed to the display area DA of the display panel PNL. The camera CA is connected to the imaging circuit IM. In the present embodiment, the camera CA is not connected to the controller CON, but the camera CA may be connected to the controller CON through the imaging circuit IM. As described above, since the display panel PNL is a transparent display, the camera CA can be visually identified through the face FFC, so that a subject (user or collocutor) can be shot through the display panel PNL.

The controller CON is capable of controlling the drive of the display panel PNL and the drive of the light source unit LU. The controller CON is capable of synchronizing the drive of the display panel PNL and the drive of the light source unit LU. Note that the controller CON may control the drive of the camera CA as necessary. In that case, the controller CON can synchronize the drive of the display panel PNL, the drive of the light source unit LU, and the drive of the camera CA. The controller CON, the display panel PNL, and the light source unit LU are constituent elements of a display device DSP. The controller CON, the microphone MC, and the speaker SK are each connected to the processing unit PU.

For example, the electronic apparatuses EA1 and EA2 may perform wireless communication through the Internet with the antennas ANT1 and ANT2, respectively. The controller CON (CON1 or CON2) controls the display panel PNL, the light source unit LU, and the camera CA, based on the signals transmitted and received with the antenna ANT (ANT1 or ANT2).

Alternatively, the communication between the electronic apparatuses EA1 and EA2 may be wired communication without being limited to wireless communication. Furthermore, the communication between the electronic apparatuses EA1 and EA2 may be direct wireless communication or direct wired communication.

FIG. 2 is a block diagram showing the positional relationship between a user, a display panel, and a camera.

The display panel PNL1 emits image light IMLf and image light IMLr to the face FFC1 and the face RFC1, respectively, to display video pictures (display images). Referring to FIG. 2, the line of sight MSN1 of the user USR1 is indicated with an arrow. The user USR1 matches its line of sight MSN1 with the line of sight of the user USR2 displayed as an image, so that the user USR1 can feel realistic even in the online meeting.

However, even when the user USR1 looks at the face of the user USR2 displayed on the face FFC1, the line of sight MSN1 is not necessarily matched with that of the user USR2. This is because the camera CA1 is disposed on the side of location of the face RFC1 opposite to the face FFC1 of the display panel PNL1. The camera CA1 is unable to perform capturing at a position such that the line of sight MSN1 is directed to the face of the user USR2.

FIG. 3 illustrates the positional relationship between the display panel PNL1 and the camera CA1 viewed from the user USR1. The image captured by the camera CA2 of the electronic apparatus EA2 is displayed in an area IA2 that is part of the face FFC1 of the display panel PNL1. Referring to FIG. 3, the user USR2 is displayed in the area IA2.

Referring to FIG. 3, the camera CA1 of the electronic apparatus EA1 is superposed on the area IA2 but is not superposed on the user USR2, particularly, on the face of the user USR2. When the user USR1 directs the line of sight MSN1 to the face of the user USR2 displayed, the camera CA1 captures, for example, a profile (face seen from the side) of the user USR1. On the display panel PNL2, the user USR2 can view only the profile of the user USR1. Thus, the users USR1 and USR2 are unable to make eye contact with each other.

With the user USR1 directing the line of sight MSN1 to the camera CA1, an image of the front of the user USR1 is displayed on the display panel PNL2. The user USR2 can direct the line of sight of the user USR2 to the image of the front of the user USR1 displayed on the display panel PNL2. However, the user USR1 needs to look at the camera CA1 only and thus is unable to direct the line of sight MSN1 to the face of the user USR2 displayed on the display panel PNL1.

As above, in a case where difference is present between the position of the collocutor in the online meeting and the position of the camera, no eye contact can be made with the collocutor displayed on the screen. Thus, deterioration is likely to occur in the quality of communication.

In order to solve such a problem as above, there is a proposed system that achieves eye contact, with a camera mounted on the back surface of a display panel. However, according to such technology, for example, in a case where a change is made in the position of a user or in a case where a plurality of users participates in, eye contact is unlikely to be made.

In the present embodiment, the position of the camera CA1 provided on the side of location of the face RFC1, the position of the area IA2 in which the captured collocutor (user USR2) is displayed, and the position of the eyes of the collocutor displayed in the area IA2 are compared. In a case where difference is present, the difference is corrected, so that the line of sight of the user USR1 observing the display panel PNL1 and the line of sight of the user USR2 displayed can be kept in matching.

In the present embodiment, the number of users is not limited. Though a case where an online meeting is held between the two users USR1 and USR2 has been given above, the present embodiment can be applied to an online meeting in which three or more people participate. Note that, as definitions in the present specification, the user USR1 is a user (oneself) who uses an electronic apparatus EA, the user USR2 is a collocutor (user) with which the user USR1 desires to make eye contact, and another user USR is a participant in the online meeting but is not a collocutor with which the user USR1 desires to make eye contact.

FIG. 4 illustrates a positional relationship between the user USR2 displayed on the display panel PNL1 and the camera CA1.

As shown in FIG. 3, in a case where the area IA2 displayed on the display panel PNL1 is not superposed on the camera CA1 or in a case where the eyes of the user USR2 are not superposed on the camera CA1, the controller CON1 senses the state.

The position of the camera CA1 is stored in advance in the controller CON1. The controller CON1 compares the position of the camera CA1 with the position at which the area IA2 is displayed or the position at which the eyes of the user USR2 are displayed. As a result of the comparison, in a case where difference is present between the position of the camera CA1 and the position at which the area IA2 is displayed or the position at which the eyes of the user USR2 are displayed, the controller CON1 moves the position of the area IA2 displayed or the position of the eyes of the user USR2 displayed such that the area IA2 or the eyes of the user USR2 are superposed on the camera CA1. Thus, the user USR1 viewing the display panel PNL1 and the user USR2 displayed on the display panel PNL1 can keep eye contact with each other.

Alternatively, as described above, with the user USR1 directing its line of sight to the face of the user USR2 displayed, the camera CA1 captures, for example, a profile of the user USR1. That is, display of a profile of the user USR1 on the display panel PNL2 indicates that the line of sight of the user USR1 is not directed to the position of the camera CA1.

In response to display of a profile of the user USR1 on the display panel PNL2, the controller CON2 of the electronic apparatus EA2 transmits information regarding the display to the controller CON1 of the electronic apparatus EA1. When the controller CON1 receives the information, the controller CON1 determines that the line of sight of the user USR1 is not directed to the position of the camera CA1. In this case, similarly to the above, the controller CON1 moves the position of the area IA2 displayed or the position of the eyes of the user USR2 displayed such that the area IA2 or the eyes of the user USR2 are superposed on the camera CA1. Thus, the users USR1 and USR2 can make eye contact on the display panels PNL1 and PNL2, respectively.

Figure 5:
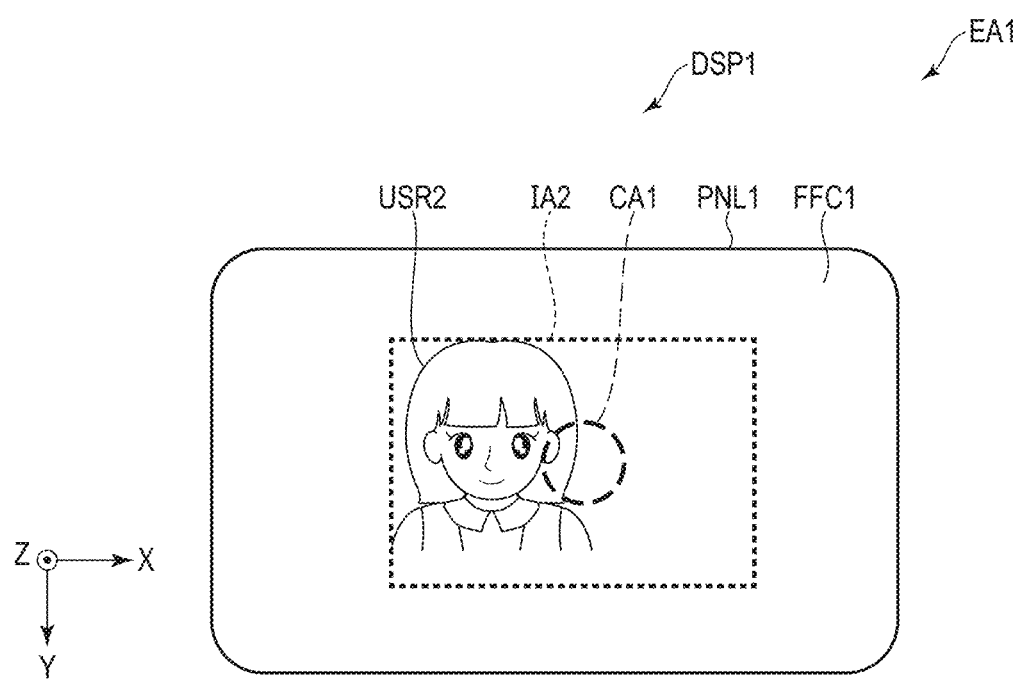
FIG. 5 illustrates another positional relationship between the user displayed on the display panel and the camera.

FIG. 5 illustrates another positional relationship between the user USR2 displayed on the display panel PNL1 and the camera CA1. When the user USR2 changes its sitting position or posture during the online meeting, as shown in FIG. 5, it is conceivable that the area IA2 is superposed on the camera CA1 but the position of the face (eyes) of the user USR2 displayed is not superposed on the camera CA1.

In the above case, the controller CON2 of the electronic apparatus EA2 can notify the collocutor (user USR2) that the position or posture has deviated. First, the controller CON1 of the electronic apparatus EA1 senses that the position of the face (eyes) of the user USR2 is not superposed on the camera CA1. The controller CON1 transmits, to the controller CON2 of the electronic apparatus EA2, information acquired by the sensing. Based on the received information, the controller CON2 can notify the user USR2 that the position or posture has deviated and furthermore advise the user USR2 that the position or posture be corrected.

Alternatively, when the user USR2 changes its sitting position or posture during the online meeting, the controller CON1 of the electronic apparatus EA1 can correct the image of the user USR2 displayed such that the position of the face (eyes) of the user USR2 is superposed on the camera CA1. In this manner, the image of the user USR2 shown in FIG. 5 is corrected to the image of the user USR2 shown in FIG. 4.

Figure 6:
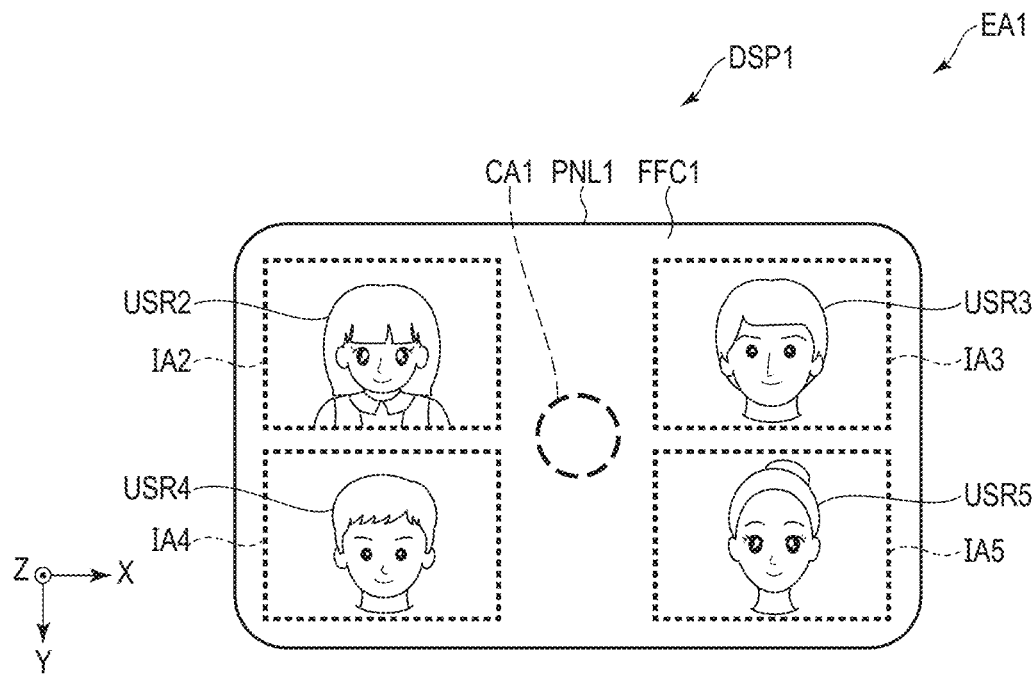
FIG. 6 illustrates a positional relationship between a plurality of users displayed on the display panel and the camera.
Figure 7:
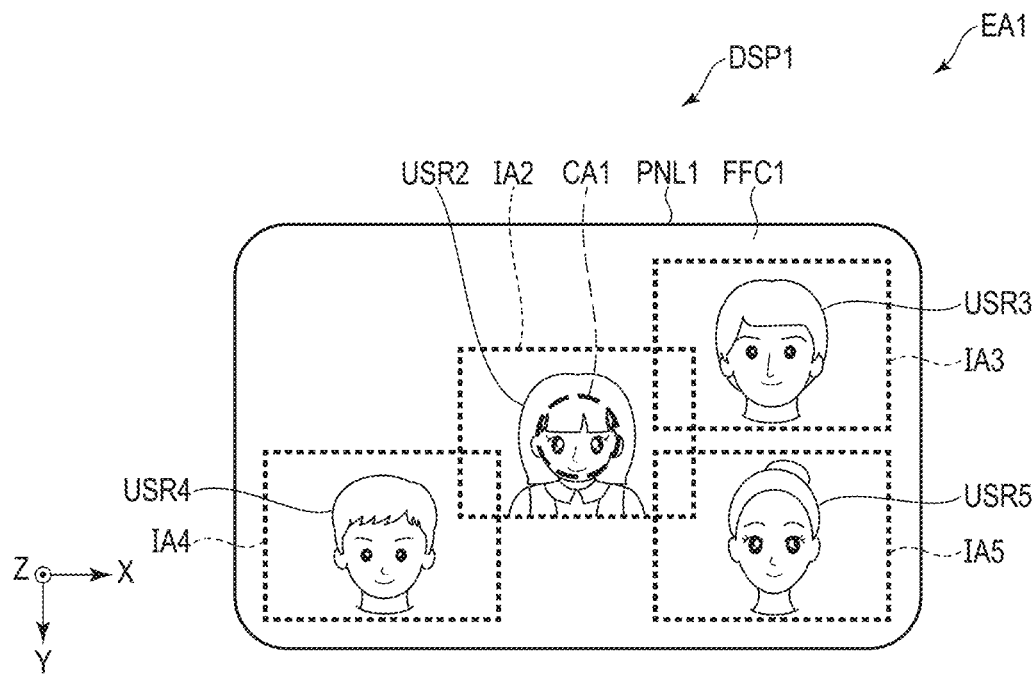
FIG. 7 illustrates another positional relationship between the users displayed on the display panel and the camera.

FIGS. 6 and 7 illustrate positional relationships between a plurality of users USR2 to USR5 displayed on the display panel PNL1 and the camera CA1. In the examples shown in FIGS. 6 and 7, an online meeting has been held between the five users USR1 to USR5. The users USR1 to USR5 are each in the online meeting with an electronic apparatus EA. On the display panel PNL1 of the electronic apparatus EA1 used by the user USR1, the other users USR2 to USR5 are displayed in areas IA2 to IA5, respectively.

In a case where such a plurality of users participates in an online meeting, the collocutor with which a user desires to make eye contact is possibly changed. In the present embodiment, the speaker can be selected as the collocutor with which eye contact is to be made or eye contact can be made with a particular person.

For example, FIG. 6 illustrates the positional relationship between the users USR2 to USR5 displayed and the camera CA1 in the initial state of the online meeting. Any of the respective images of the users USR2 to USR5 and the areas IA2 to IA5 is not superposed on the camera CA1.

For example, in a case where the user USR2 is the speaker, the user USR1 desires to focus attention on the user USR2. In response to an input to the controller CON1 of the electronic apparatus EA1 from the user USR1 (user of the electronic apparatus EA1), the controller CON1 corrects the position of the area IA2 and the position of the image of the user USR2 such that the image of the user USR2 is superposed on the camera CA1. Thus, the user USR1 can make eye contact with the user USR2. Instead of an input from the user USR1, for example, based on a change in the image of the mouth of the user USR2, the controller CON1 may detect the duration of speaking of the user USR2 to determine that the user USR2 is the target to be given attention. In addition, the controller CON2 synchronizing with the processing unit PU2 at the time of transmission of voice from the user USR2 through the microphone MC2 may instruct the controller CON1 to superpose, on the camera CA1, the image of the user USR2 displayed on the display panel PNL1.

In a case where the user USR1 desires to make eye contact with the user USR2 among the users USR2 to USR5, similarly to FIGS. 3 and 4 and the descriptions therewith, the controller CON1 is required to control an image displayed on the display panel PNL1. On the display panel PNL1, the image of the user USR2 can be displayed in superposition on the camera CA1 (refer to FIG. 7).

In the above, the user to be given attention is determined based on an input from the user USR1 or a change in an image displayed on the display panel PNL1 (e.g., a change in the image of a mouth), but the present embodiment is not limited to this. An electronic apparatus EA may be provided with an eye tracking element, and then the eye tracking element may detect the line of sight of the user who uses the electronic apparatus EA. For example, the electronic apparatus EA1 includes an eye tracking element, and the eye tracking element detects that the user USR1 has directed its line of sight to the user USR2. Information acquired by the detecting with the eye tracking element is transmitted to the controller CON1. Based on the information, the controller CON1 displays the image of the user USR2 in superposition on the camera CA1.

In a case where, after the user USR1 viewing the display panel PNL1 looks at the collocutor (user) in eye contact for a certain period of time, the user USR1 moves its line of sight to the position of the camera CA1 and further looks at another collocutor, use of the eye tracking element enables eye contact with the another collocutor. That is, for example, after the image of the user USR2 is superposed on the camera CA1, the user USR1 moves its line of sight, so that the image of the user USR3 can be next superposed on the camera CA1. Use of eye tracking technology enables detection as to who is being viewed on the display panel PNL1 or how the line of sight has moved.

Note that a case where the user USR1 looks at another user in addition to the user USR2 has been given above, but the present embodiment is not limited to this. The present embodiment can be applied per user who participates in an online meeting with an electronic apparatus EA. That is, for example, at the same time as the user USR1 makes eye contact with the user USR2, the user USR3 can make eye contact with the user USR2. In addition, for example, the user USR2 being given attention can make eye contact with the user USR1. As above, users make eye contact with each other, so that an improvement can be made in the quality of communication.

Figure 8:
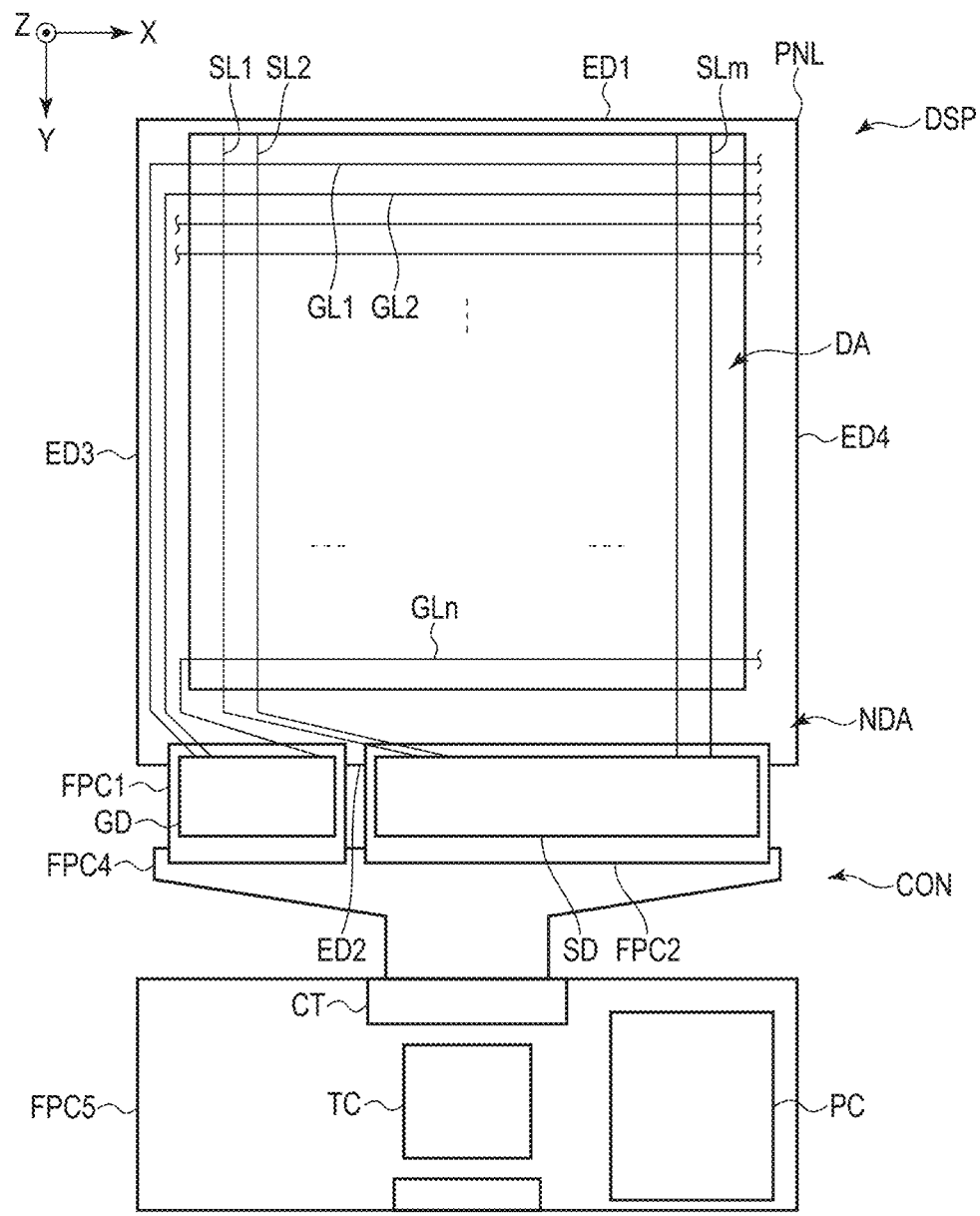
FIG. 8 is a plan view showing the configuration of a display device of either electronic apparatus shown in FIG. 1.

The structure of a display device DSP including the display panel PNL will be described in detail below. FIG. 8 is a plan view showing the configuration of the display device DSP of either electronic apparatus EA shown in FIG. 1.

The display device DSP includes the display panel PNL and wiring substrates FPC1, FPC2, FPC4, and FPC5. The display panel PNL includes the display area DA for displaying an image and a non-display area NDA being shaped like a frame and surrounding the display area DA. The display area DA includes n number of scanning lines GL (GL1 to GLn) and m number of signal lines SL (SL1 to SLm). Note that n and m are each a natural number and n and m may be equivalent to each other or may be different from each other. The scanning lines GL each extend in a first direction X and are spaced in a second direction Y. In other words, the scanning lines GL extend in a row direction. The signal lines SL each extend in the second direction Y and are spaced in the first direction X. The display panel PNL has ends ED1 and ED2 along the first direction X and ends ED3 and ED4 along the second direction Y.

The wiring substrate FPC1 includes a gate driver GD. The gate driver GD has the scanning lines GL connected thereto. The wiring substrate FPC2 includes a source driver SD. The source driver SD has the signal lines SL connected thereto. The wiring substrates FPC1 and FPC2 are each connected to the display panel PNL and the wiring substrate FPC4. The wiring substrate FPC5 includes a timing controller TC and a power supply circuit PC. The wiring substrate FPC4 is connected to a connector CT of the wiring substrate FPC5.

Note that the wiring substrates FPC1 and FPC2 may be replaced with a single wiring substrate. Alternatively, the wiring substrates FPC1, FPC2, and FPC4 may be replaced with a single wiring substrate. The gate driver GD, the source driver SD, and the timing controller TC described above are constituent elements of the controller CON according to the present embodiment. The controller CON controls the drive of the scanning lines GL, the drive of the signal lines SL, the drive of a plurality of pixel electrodes to be described below, the drive of a common electrode to be described below, the drive of the light source unit LU, and the drive of the camera CA.

FIG. 9 is a sectional view of the display device DSP shown in FIG. 8. Herein, only main parts in a section of the display device DSP along a Y-Z plane defined by the second direction Y and a third direction Z will be described.

As shown in FIG. 9, the display panel PNL includes a substrate SUB1, a substrate SUB2, and a liquid crystal layer LCY as a display function layer.

The substrate SUB1 includes a transparent base BA1, a plurality of pixel electrodes PE, and an alignment film AL1. The substrate SUB2 includes a transparent base BA2, a common electrode CE, and an alignment film AL2. The pixel electrodes PE and the common electrode CE are each formed of a transparent conductive material, such as indium tin oxide (ITO) or indium zinc oxide (IZO), and are located in the display area DA. The alignment films AL1 and AL2 are each in contact with the liquid crystal layer LCY.

The liquid crystal layer LCY is located at least in the display area DA. The liquid crystal layer LCY includes polymer dispersed liquid crystal and is held between the substrates SUB1 and SUB2. The liquid crystal layer LCY according to the present embodiment includes reverse mode polymer dispersed liquid crystal (R-PDLC). The liquid crystal layer LCY retains the parallelism of light that enters in a case where a low voltage is applied and scatters light that enters in a case where a high voltage is applied.

The substrates SUB1 and SUB2 are bonded with sealing material SAL. The substrate SUB1 has an extended portion EX elongated in the second direction Y with respect to an end ED5 of the transparent base BA2.

The wiring substrates FPC1 and FPC2 are connected to the extended portion EX of the substrate SUB1.

The light source unit LU is located in the non-display area NDA outside the display area DA. The light source unit LU includes a light-emitting element LS and a wiring substrate FPC6. The light-emitting element LS is connected to the wiring substrate FPC6 and is located on the extended portion EX. The light-emitting element LS has a light-emitting portion (light-emitting surface) EM opposed to the end ED5. Illumination light emitted from the light-emitting portion EM enters through the end ED5 and travels in the display panel PNL as described below. In other words, the light-emitting element LS is disposed adjacently to the end ED5 as a side surface of the display panel PNL, and illumination light emitted from the light-emitting element LS enters the display panel PNL through the side surface.

Figure 10:
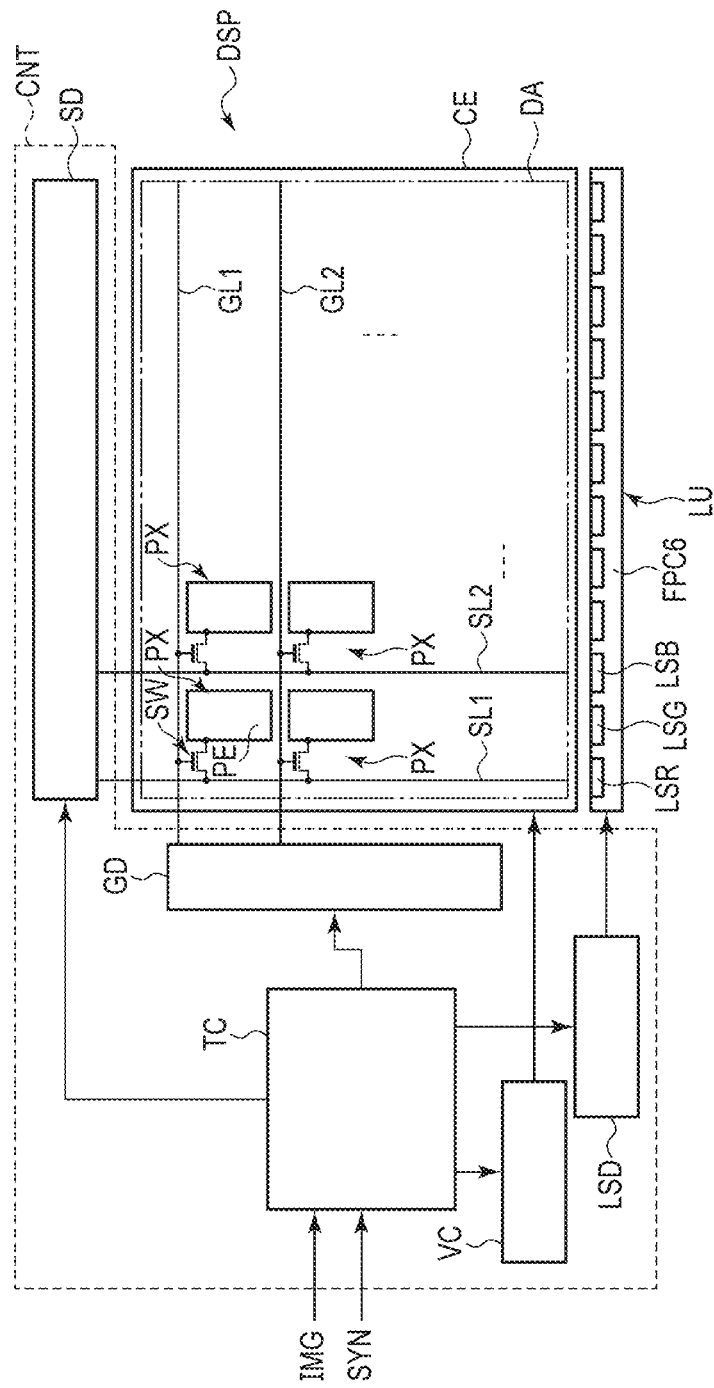
FIG. 10 illustrates main constituent elements of the display device shown in FIG. 8.

FIG. 10 illustrates main constituent elements of the display device DSP shown in FIG. 8.

As shown in FIG. 10, the display device DSP includes a controller CNT indicated with a dashed line in the figure. The controller CNT includes the timing controller TC, the gate driver GD, the source driver SD, a Vcom circuit VC, and a light source driver LSD. In the present embodiment, the controller CNT is also referred to as a controller described above.

The timing controller TC generates various types of signals, for example, based on image data IMG or a synchronization signal SYN input from outside. For example, the timing controller TC outputs, to the source driver SD, a video signal generated by predetermined signal processing, based on the image data IMG. In addition, the timing controller TC outputs control signals generated based on the synchronization signal SYN one-to-one to the gate driver GD, the source driver SD, the Vcom circuit VC, and the light source driver LSD. The timing controller TC will be described in detail below.

The display area DA indicated with a chain double-dashed line in the figure includes a plurality of pixels PX. The pixels PX each include a switching element SW and a pixel electrode PE. For example, the switching element SW is formed of a thin film transistor (TFT). The switching element SW is electrically connected to a scanning line GL and a signal line SL. The pixel electrodes PE are located in the display area DA and are provided in a matrix. For this reason, for example, the pixel electrodes PE are provided in a plurality of rows. The pixel electrodes PE are each connected to the signal line SL through the switching element SW. The common electrode CE is located in the display area DA. The common electrode CE is opposed to the pixel electrodes PE. Note that, differently from the present embodiment, the common electrode CE may be segmented at least per single pixel PX, and the same common voltage may be applied to the segmented common electrodes CE in connection with a common line.

The scanning lines GL are each supplied with a gate signal from the gate driver GD. The signal lines SL are each supplied with a video signal (image signal) from the source driver SD. The common electrode CE is supplied with a common voltage Vcom from the Vcom circuit VC. The video signal supplied to each signal line SL is applied, in the period during which, based on the gate signal supplied to each scanning line GL, the corresponding switching element SW is in conduction, to the pixel electrode PE connected to the corresponding switching element SW. In the following description, formation of potential difference between a pixel electrode PE and the common electrode CE due to application of a video signal to the pixel electrode PE is equivalent to write of the video signal to (or application of voltage to) the pixel PX including the pixel electrode PE.

The light source unit LU emits light to the liquid crystal layer LCY. In the present embodiment, the light source unit LU emits non-achromatic color light to the liquid crystal layer LCY. The light source unit LU includes a plurality of light-emitting elements LS different in color. For example, the light source unit LU includes a light-emitting element (first light-emitting element) LSR that emits first color light to the liquid crystal layer LCY, a light-emitting element (second light-emitting element) LSG that emits second color light to the liquid crystal layer LCY, and a light-emitting element (third light-emitting element) LSB that emits third color light to the liquid crystal layer LCY. Needless to say, the first color, the second color, and the third color are different from each other. In the present embodiment, the first color, the second color, and the third color are red (R), green (G), and blue (B), respectively.

The light source driver LSD controls the respective periods of lighting of the light-emitting elements LSR, LSG, and LSB. In a drive system in which one frame period includes a plurality of sub-frame periods, at least one of the three light-emitting elements LSR, LSG, and LSB lights up in each sub-frame, and the color of illumination light switches per sub-frame, though to be described in detail below.

A configuration example of a display device including a liquid crystal layer LCY as a polymer dispersed liquid crystal layer will be described below. FIG. 11 is a schematic view showing the liquid crystal layer LCY in a transparent state.

As shown in FIG. 11, the liquid crystal layer LCY includes a liquid crystal polymer PLM and liquid crystal molecules LCM. For example, the liquid crystal polymer PLM results from polymerization of liquid crystal monomers oriented in a predetermined direction by an alignment restriction force based on the alignment films AL1 and AL2. The liquid crystal molecules LCM are dispersed in liquid crystal monomers and are oriented in a predetermined direction, depending on the direction of orientation of the liquid crystal monomers at the time of polymerization of the liquid crystal monomers.

In the present embodiment, the alignment films AL1 and AL2 are each a horizontal alignment film for initial alignment of the liquid crystal monomers and the liquid crystal molecules LCM along an X-Y plane defined by the first direction X and the second direction Y. The liquid crystal molecules LCM are each a positive liquid crystal molecule having positive dielectric anisotropy.

Note that, differently from the present embodiment, the alignment films AL1 and AL2 may be each a vertical alignment film for initial alignment of the liquid crystal monomers and the liquid crystal molecules LCM along the third direction Z. In addition, the liquid crystal molecules LCM may be each a negative liquid crystal molecule having negative dielectric anisotropy.

The liquid crystal polymer PLM and the liquid crystal molecules LCM each have equivalent optical anisotropy. Alternatively, the liquid crystal polymer PLM and the liquid crystal molecules LCM each have substantially equivalent refractive anisotropy. That is, the liquid crystal polymer PLM and the liquid crystal molecules LCM are substantially equivalent to each other in ordinary refractive index and in extraordinary refractive index.

Note that the liquid crystal polymer PLM and the liquid crystal molecules LCM are not necessarily completely identical to each other in ordinary refractive index and in extraordinary refractive index, and thus difference due to errors in manufacturing is allowable. In addition, the liquid crystal polymer PLM is different in responsivity to the electric field from the liquid crystal molecules LCM. That is, the liquid crystal polymer PLM is lower in responsivity to the electric field than the liquid crystal molecules LCM.

The example shown in FIG. 11 corresponds to, for example, a state where no voltage has been applied to the liquid crystal layer LCY, a state where potential difference is zero between the pixel electrode PE and the common electrode CE, or a state where a second transparent voltage, to be described below, has been applied to the liquid crystal layer LCY.

As shown in FIG. 11, the optical axis Ax1 of the liquid crystal polymer PLM and the optical axis Ax2 of the liquid crystal molecules LCM are parallel to each other. In the example illustrated, the optical axis Ax1 and the optical axis Ax2 are both parallel to the first direction X. Such optical axes each correspond to a line parallel to the direction of travel of a ray of light such that a single value of refractive index is obtained regardless of the direction of polarization.

As above, the liquid crystal polymer PLM and the liquid crystal molecules LCM each have substantially equivalent refractive anisotropy and furthermore the optical axes Ax1 and Ax2 are parallel to each other. Thus, in any directions including the first direction X, the second direction Y, and the third direction Z, almost no refractive index difference is present between the liquid crystal polymer PLM and the liquid crystal molecules LCM.

For this reason, light LT1 having entered the liquid crystal layer LCY in the third direction Z passes through substantially without being scattered in the liquid crystal layer LCY. The liquid crystal layer LCY can retain the parallelism of the light LT1. Similarly, light LT2 and light LT3 having entered in oblique directions angled with respect to the third direction Z are hardly scattered in the liquid crystal layer LCY. For this reason, high transparency can be obtained. The state shown in FIG. 11 is referred to as the "transparent state".

FIG. 12 is a schematic view showing the liquid crystal layer LCY in a scattered state.

As shown in FIG. 12, the liquid crystal polymer PLM is lower in responsivity to the electric field than the liquid crystal molecules LCM, as described above. For this reason, in a state where a voltage (a scattering voltage described later) higher than the second transparent voltage and a first transparent voltage, to be described below, has been applied to the liquid crystal layer LCY, almost no change is made in the direction of orientation of the liquid crystal polymer PLM, but a change is made in the direction of orientation of the liquid crystal molecules LCM, depending on the electric field. That is, as illustrated, the optical axis Ax1 is almost parallel to the first direction X, but the optical axis Ax2 is angled with respect to the first direction X. For this reason, the optical axes Ax1 and Ax2 intersect with each other.

Therefore, in any directions including the first direction X, the second direction Y, and the third direction Z, a large refractive index difference occurs between the liquid crystal polymer PLM and the liquid crystal molecules LCM. Thus, the light LT1, the light LT2, and the light LT3 having entered the liquid crystal layer LCY are scattered in the liquid crystal layer LCY. The state shown in FIG. 12 is referred to as the "scattered state".

The controller CON switches the liquid crystal layer LCY to at least either the transparent state or the scattered state.

Figure 13:
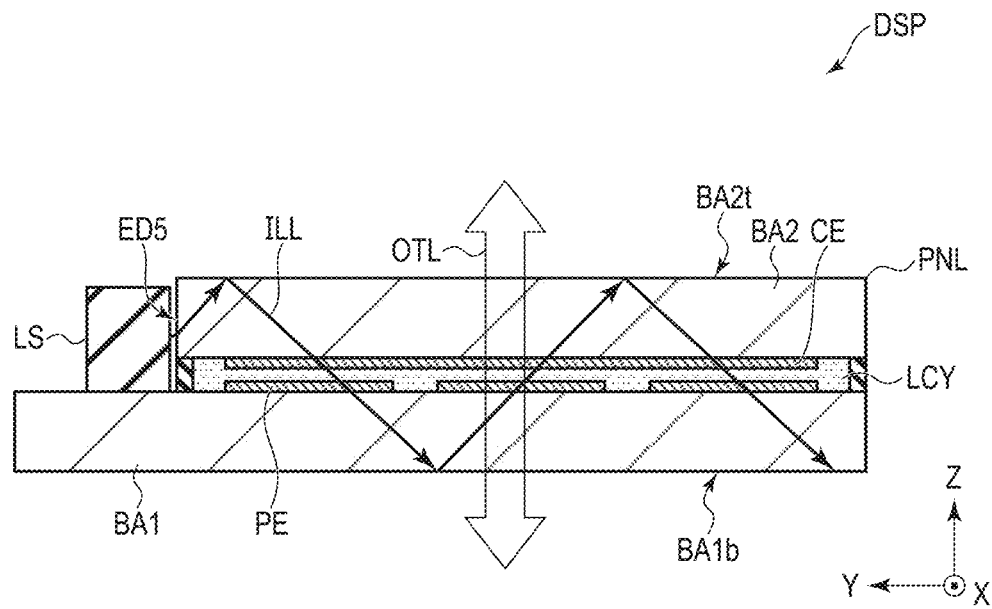
FIG. 13 is a sectional view showing the display panel with the liquid crystal layer in the transparent state.

FIG. 13 is a sectional view showing the display panel PNL with the liquid crystal layer LCY in the transparent state. As shown in FIG. 13, illumination light ILL emitted from the light-emitting element LS enters the display panel PNL through the end ED5 and travels, for example, through the transparent base BA2, the liquid crystal layer LCY, and the transparent base BA1. With the liquid crystal layer LCY in the transparent state, the illumination light ILL is hardly scattered in the liquid crystal layer LCY and thus hardly leaks from the lower surface BA1b of the transparent base BA1 and the upper surface BA2t of the transparent base BA2.

Ambient light (external light) OTL that enters the display panel PNL passes through almost without being scattered in the liquid crystal layer LCY. That is, the ambient light OTL having entered the display panel PNL through the lower surface BA1b passes through the upper surface BA2t, and the ambient light OTL having entered through the upper surface BA2t passes through the lower surface BA1b. For this reason, when observing the display panel PNL from the side of location of the upper surface BA2t, the user can visually identify the background on the side of location of the lower surface BA1b through the display panel PNL. Similarly, when the camera CA shoots the display panel PNL from the side of location of the lower surface BA1b, the subject on the side of location of the upper surface BA2t can be shot through the display panel PNL.

Figure 14:
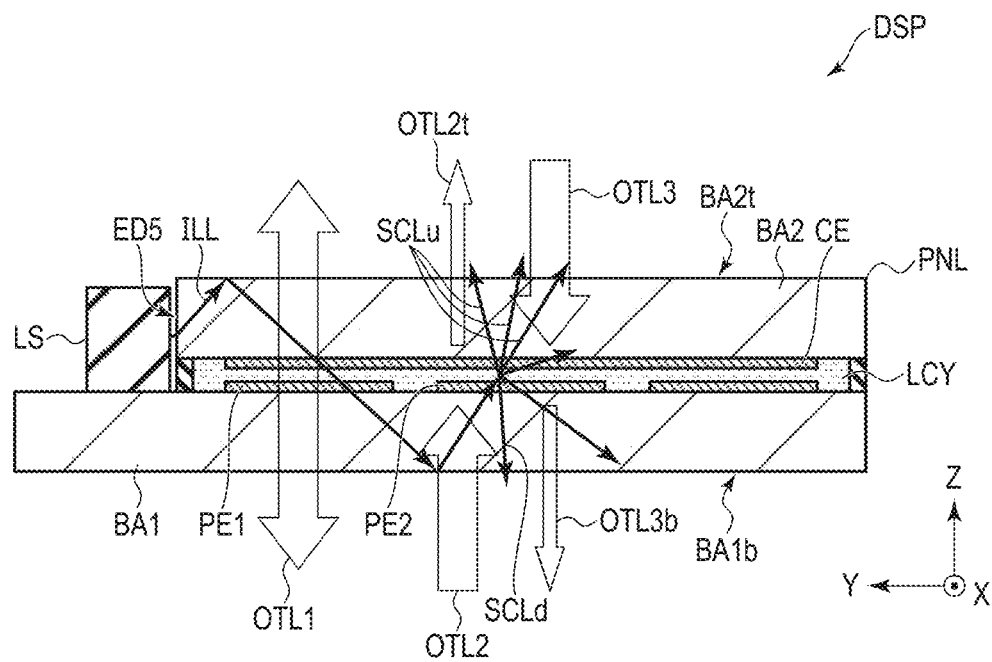
FIG. 14 is a sectional view showing the display panel with the liquid crystal layer in the scattered state.

FIG. 14 is a sectional view showing the display panel PNL with the liquid crystal layer LCY in the scattered state. As shown in FIG. 14, illumination light ILL emitted from the light-emitting element LS enters the display panel PNL through the end ED5 and travels, for example, through the transparent base BA2, the liquid crystal layer LCY, and the transparent base BA1. In the example illustrated, the liquid crystal layer LCY between a pixel electrode PE1 and the common electrode CE (liquid crystal area to which the applied voltage across the pixel electrode PE1 and the common electrode CE is applied) is in the transparent state. For this reason, the illumination light ILL is hardly scattered in the liquid crystal area opposed to the pixel electrode PE1, in the liquid crystal layer LCY.

In contrast, the liquid crystal layer LCY between a pixel electrode PE2 and the common electrode CE (liquid crystal area to which the applied voltage across the pixel electrode PE2 and the common electrode CE is applied) is in the scattered state. For this reason, the illumination light ILL is scattered in the liquid crystal area opposed to the pixel electrode PE2, in the liquid crystal layer LCY. Scattered light SCLu of part of the illumination light ILL is released outward through the upper surface BA2t, and scattered light SCLd of part of the illumination light ILL is released outward through the lower surface BA1b.

Ambient light OTL1 that enters the display panel PNL at any position superposed on the pixel electrode PE1, passes through almost without being scattered in the liquid crystal layer LCY, similarly to the ambient light OTL shown in FIG. 13.

Ambient light OTL2 having entered through the lower surface BA1b at any position superposed on the pixel electrode PE2 is scattered in the liquid crystal layer LCY and then ambient light OTL2t of part thereof passes through the upper surface BA2t. In addition, ambient light OTL3 having entered through the upper surface BA2t is scattered in the liquid crystal layer LCY and then ambient light OTL3b of part thereof passes through the lower surface BA1b.

For this reason, when the display panel PNL is observed from the side of location of the upper surface BA2t, the color of the illumination light ILL can be visually identified at any position superposed on the pixel electrode PE2. Furthermore, since the ambient light OTL2t passes through the display panel PNL, the background on the side of location of the lower surface BA1b can be visually identified through the display panel PNL. Similarly, when the camera CA shoots the display panel PNL from the side of location of the lower surface BA1b, the camera CA detects the color of the illumination light ILL at any position superposed on the pixel electrode PE2.

Furthermore, since the ambient light OTL3b passes through the display panel PNL, when the camera CA shoots the display panel PNL from the side of location of the lower surface BA1b, the subject on the side of location of the upper surface BA2t can be shot through the display panel PNL. Note that, since the liquid crystal layer LCY is in the transparent state at any position superposed on the pixel electrode PE1, the subject can be shot through the display panel PNL with almost no visual identification of the color of the illumination light ILL.

Figure 15:
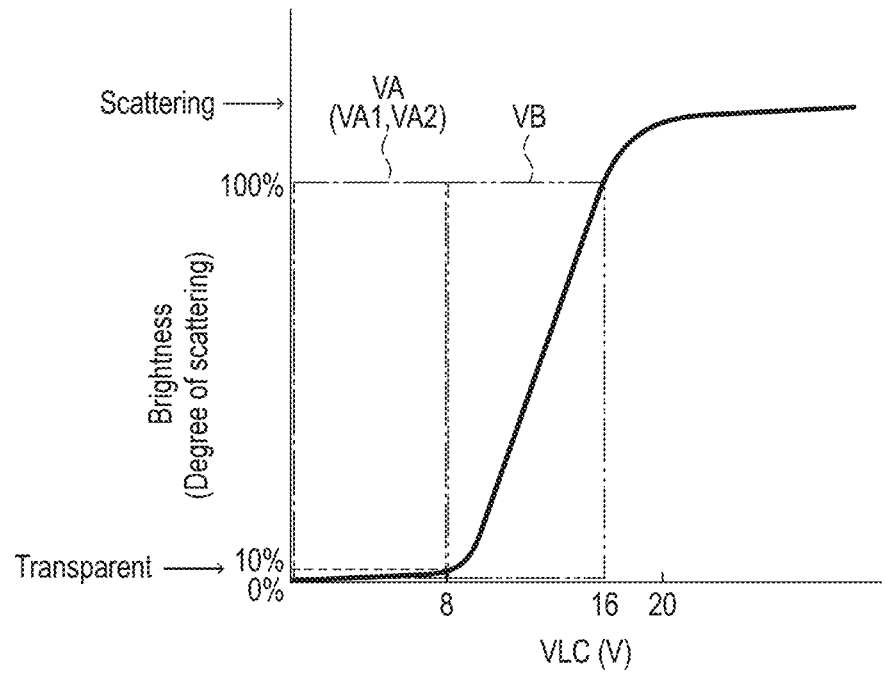
FIG. 15 is a graph showing the characteristic of scattering of the liquid crystal layer.

FIG. 15 is a graph showing the characteristic of scattering of the liquid crystal layer. FIG. 15 indicates the relationship between voltage VLC applied to the liquid crystal layer LCY and brightness. The brightness in FIG. 15 corresponds to, for example, as shown in FIG. 14, the brightness of the scattered light SCLu obtained when the illumination light ILL emitted from the light-emitting element LS is scattered in the liquid crystal layer LCY. In other words, the brightness corresponds to the degree of scattering of the liquid crystal layer LCY.

As shown in FIG. 15, as the voltage VLC rises from approximately 0 V, the brightness rises sharply from the voltage VLC of approximately 8 V. When the voltage VLC reaches approximately 20 V, the brightness becomes saturated. Note that, as the voltage VLC rises from 0 V to 8 V, the brightness rises slightly. In the present embodiment, the area surrounded by a chain double-dashed line, namely, the voltage ranging from 8 V to 16 V is used for gradation reproduction per pixel PX (e.g., 256 gradations). Hereinafter, the voltage: 8 V<VLC≤16 V is referred to as scattering voltage VB.

In addition, in the present embodiment, the area surrounded by a chain single-dashed line, namely, the voltage: 0 V≤VLC≤8 V is referred to as transparent voltage VA. The transparent voltage VA includes a first transparent voltage VA1 and a second transparent voltage VA2. Note that the respective lower limits and upper limits of the scattering voltage VB and the transparent voltage VA are not limited to this example and thus are required to be determined appropriately depending on the characteristic of scattering of the liquid crystal layer LCY.

In the present embodiment, reverse mode polymer dispersed liquid crystal is used for the liquid crystal layer LCY. For this reason, the scattering voltage VB is higher than the first transparent voltage VA1. Note that, in a case where normal mode polymer dispersed liquid crystal is used for the liquid crystal layer LCY, the first transparent voltage VA1 is higher than the scattering voltage VB.

Now, the maximum in the degree of scattering of light that enters the liquid crystal layer LCY at the time of application of the scattering voltage VB to the liquid crystal layer LCY is defined as 100%. Referring to FIG. 15, the degree of scattering at the time of application of a scattering voltage VB of 16 V to the liquid crystal layer LCY is 100%. For example, the transparent voltage VA can be defined as a range of voltage VLC in which the degree of scattering (brightness) is less than 10%. Alternatively, the transparent voltage VA can be defined as the voltage VLC not more than the voltage corresponding to the minimum gradation (8 V in the example of FIG. 15).

For example, the first transparent voltage VA1 may be a range of voltage in which the degree of scattering is not less than 10% and not more than 50%. In addition, the second transparent voltage VA2 may be a range of voltage in which the degree of scattering is less than 10%. Furthermore, the first transparent voltage VA1 may be identical to the second transparent voltage VA2 such that the first transparent voltage VA1 is a range of voltage in which the degree of scattering is less than 10%.

Note that the graph shown in FIG. 15 can be applied to a case where the polarity of voltage applied to the liquid crystal layer LCY is positive (+) and a case where the polarity of voltage applied to the liquid crystal layer LCY is negative (−). In the latter case, the voltage VLC is the absolute value of negative voltage.

The liquid crystal layer LCY of the display panel PNL may be driven by a polarity-inversion drive scheme in which the polarity of applied voltage is inverted. Examples of such a polarity-inversion drive scheme include a line-inversion drive scheme and a frame-inversion drive scheme. For example, in a single-line-inversion drive scheme, the voltage applied to the liquid crystal layer LCY (write voltage to pixels PX) is inverted between positive polarity (+) and negative polarity (−) per single group of pixels PX (single line) connected to one scanning line GL. An exemplary line-inversion drive scheme in which inversion is performed per single line has been given, but the present embodiment is not limited to this. Another line-inversion drive scheme in which inversion is performed per two or more lines may be adopted.

In such a frame-inversion drive scheme, the voltage applied to the liquid crystal layer LCY is inverted between positive polarity (+) and negative polarity (−) per frame period in which an image corresponding to one piece of image data is displayed. In the frame-inversion drive scheme, for example, the polarity of the common voltage and the polarity of the video signal are both inverted per single frame period. Note that the polarity of the video signal corresponds to the polarity of the voltage applied to the signal lines SL, furthermore, corresponds to the polarity of the voltage applied to the pixel electrodes PE through the signal lines SL. The polarity of the common voltage is the polarity of the voltage applied to the common electrode CE. In the frame-inversion drive scheme, the polarity of the video signal and the polarity of the common electrode may be inverted per single frame or per sub-frame based on division of one frame into a plurality of sub-frames.

Figure 20:
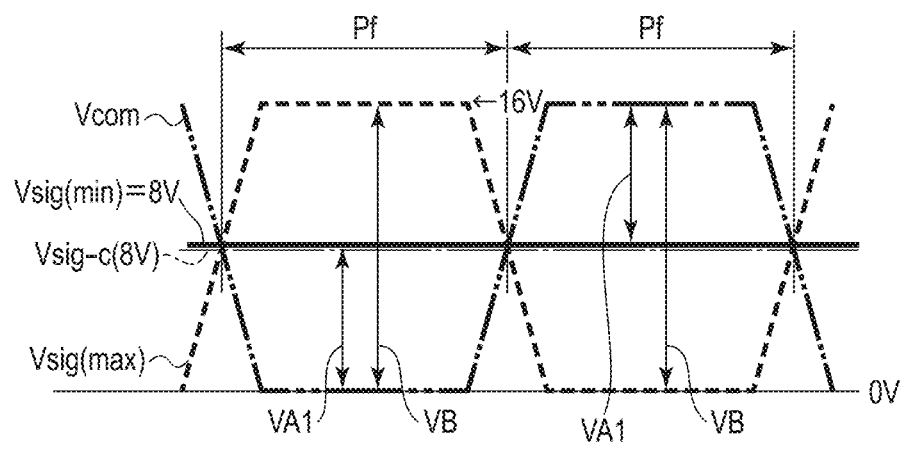
FIG. 20 illustrates an exemplary common voltage supplied to a common electrode and an exemplary signal line voltage applied to a signal line (or pixel electrodes) in the display drive to which a common-inversion drive scheme is applied.

FIG. 20 illustrates an exemplary common voltage Vcom supplied to the common electrode CE and an exemplary signal line voltage Vsig applied to each signal line SL (or each pixel electrode PE) in the display drive to which a common-inversion drive scheme is applied.

Referring to FIG. 20, regarding the signal line voltage Vsig, a waveform corresponding to the maximum (max) in gradation and a waveform corresponding to the minimum (min) in gradation are shown. Herein, the waveform of the signal line voltage Vsig(min), the waveform of the common voltage Vcom, and the waveform of the signal line voltage Vsig(max) are indicated with a solid line, a chain double-dashed line, and a dashed line, respectively. Referring to FIG. 20, the common voltage Vcom and the signal line voltage Vsig (refer to the waveform for the maximum) are inverted in polarity per single frame period Pf. Reference voltage Vsig-c is, for example, 8 V. The common voltage Vcom and the signal line voltage Vsig each have a lower limit of 0 V and an upper limit of 16 V.

Note that, in a case where a frame period Pf includes a plurality of sub-frame periods, the polarity of the common voltage Vcom and the polarity of the signal line voltage Vsig may be both inverted per single field period (single sub-frame period), instead of per single frame period Pf.

Now, we focus on a polarity-inversion drive scheme in consideration of not only the example shown in FIG. 20 but also an example in FIG. 21 to be described below. In a case where the drive voltage applied to the liquid crystal layer LCY (write voltage to each pixel PX) is positive in polarity, the difference (Vsig−Vcom) between the signal line voltage Vsig and the common voltage Vcom is 0 V or a positive voltage value. In contrast, in a case where the drive voltage applied to the liquid crystal layer LCY (write voltage to each pixel PX) is negative in polarity, the difference (Vsig−Vcom) between the signal line voltage Vsig and the common voltage Vcom is 0 V or a negative voltage value.

In the period in which a positive voltage is written to each pixel PX, the common voltage Vcom is 0 V and the signal line voltage Vsig is a voltage value, in the range of 8 V to 16 V, corresponding to the gradation indicated by the image data. In contrast, in the period in which a negative voltage is written to each pixel PX, the common voltage Vcom is 16 V and the signal line voltage Vsig is a voltage value, in the range of 0 V to 8 V, corresponding to the gradation indicated by the image data. That is, in either case, a voltage not less than 8 V and not more than 16 V is applied across the common electrode CE and each pixel electrode PE.

Even in a case where the voltage VLC applied to the liquid crystal layer LCY is 8 V, in other words, even in a case where the first transparent voltage VA1 is applied to the liquid crystal layer LCY, the liquid crystal layer LCY has a degree of scattering ranging approximately from 0 to 10%. Therefore, even in a case where the signal line voltage Vsig is minimum in gradation, ambient light that enters the display panel PNL is slightly scattered, leading to a deterioration in the visibility of the background through the display panel PNL.

For this reason, adoption of transparent drive (drive in a reset period to be described below) in which, for example, the voltage across the pixel electrodes PE and the common electrode CE is made smaller than the lower limit in gradation, into a sequence of image display enables an improvement in the visibility of the background through the display panel PNL. Furthermore, the camera CA can shoot the subject through the display panel PNL, more clearly.

The relationship between the output of the source driver SD and the common voltage Vcom will be now described.

In a case where the withstand voltage of the source driver SD is low, the common voltage Vcom is driven inversely for an increase in the liquid crystal applied voltage. At the time, simultaneously, the source driver SD can only output either the signal line voltage Vsig positive in polarity (e.g., from the reference voltage Vsig-c to 16 V) or the signal line voltage Vsig negative in polarity (e.g., from 0 V to the reference voltage Vsig-c). In addition, the common voltage Vcom is inverse in polarity to the output of the source driver SD.

Note that, in a case where the withstand voltage of the source driver SD is high, the relationship between the signal line voltage Vsig and the common voltage Vcom may be the following relationship, instead of the above relationship. That is, the common voltage Vcom is fixed at 0 V, and the signal line voltage Vsig that the source driver SD outputs ranges from 0 V to +16 V at the time of positive polarity and ranges from −16 V to 0 V at the time of negative polarity.

Figure 21:
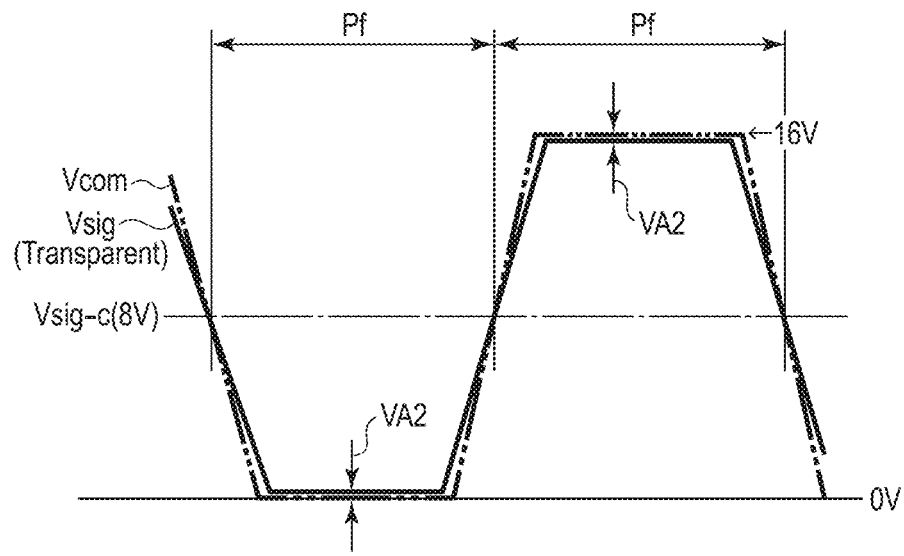
FIG. 21 illustrates an exemplary common voltage and an exemplary signal line voltage in transparent drive.

FIG. 21 illustrates an exemplary common voltage Vcom and an exemplary signal line voltage Vsig in transparent drive. Herein, the waveform of the signal line voltage Vsig is indicated with a solid line and the waveform of the common voltage Vcom is indicated with a chain double-shaded line. Referring to FIG. 21, the signal line voltage Vsig in transparent drive is denoted with Vsig (Transparent).

As shown in FIG. 21, the common voltage Vcom switches alternately between 0 V and 16 V per single frame period Pf, similarly to the example of FIG. 20. In transparent drive, the voltage value of the signal line voltage Vsig is identical to the voltage value of the common voltage Vcom per frame period Pf (Vsig=Vcom=0 V or Vsig=Vcom=16 V). Note that, referring to FIG. 21, for illustration reasons, the signal line voltage Vsig and the common voltage Vcom are not completely identical to each other. A voltage of 0 V is applied to the liquid crystal layer LCY. In other words, the second transparent voltage VA2 is applied to the liquid crystal layer LCY.

Note that the signal line voltage Vsig in transparent drive is not limited to the example shown in FIG. 21. For example, in the period in which the common voltage Vcom is 0 V, the signal line voltage Vsig may be more than 0 V and less than 8 V (0 V<Vsig<8 V). In the period in which the common voltage Vcom is 16 V, the signal line voltage Vsig may be more than 8 V and less than 16 V (8 V<Vsig<16 V).

In either case, in transparent drive, the absolute value of the difference between the signal line voltage Vsig and the common voltage Vcom is less than 8 V, resulting in an increase in the parallelism of light that passes through the liquid crystal layer LCY. In other words, the second transparent voltage VA2 is not limited to 0 V and the absolute value of the second transparent voltage VA2 may be less than 8 V.

Note that, in transparent drive, the voltage applied to the liquid crystal layer LCY is required to be less than the lower limit in gradation (e.g., 8 V) and thus the signal line voltage Vsig is not necessarily completely identical to the common voltage Vcom. As above, the maximum in the degree of scattering of light that enters the liquid crystal layer LCY at the time of application of the scattering voltage VB to the liquid crystal layer LCY is defined as 100%. For example, desirably, the second transparent voltage VA2 is a voltage at which the degree of scattering is less than 10%.

Figure 22:
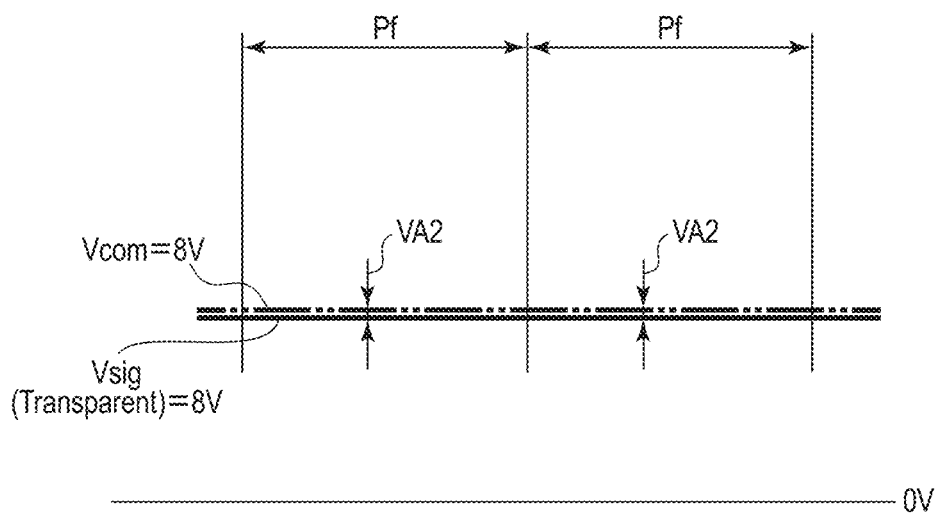
FIG. 22 illustrates another exemplary common voltage and another exemplary signal line voltage in transparent drive.

FIG. 22 illustrates another exemplary common voltage Vcom and another exemplary signal line voltage Vsig in transparent drive. Herein, the waveform of the signal line voltage Vsig is indicated with a solid line and the waveform of the common voltage Vcom is indicated with a chain double-shaded line.

As shown in FIG. 22, in the example, in transparent drive, the common voltage Vcom and the signal line voltage Vsig are not inverted in polarity. Furthermore, the common voltage Vcom and the signal line voltage Vsig are both 8 V (reference voltage Vsig-c described above). Note that the common voltage Vcom and the signal line voltage Vsig may be both a voltage different from the reference voltage Vsig-c, such as 0 V. In addition, desirably, the second transparent voltage VA2 is a voltage at which the degree of scattering is less than 10%, similarly to the case shown in FIG. 21.

The display device DSP (display panel PNL) according to the present embodiment is driven, for example, by a drive system in which one frame period includes a plurality of sub-frame (field) periods. Such a drive system is called, for example, a field sequential system. In the system, a red (R) image, a green (G) image, or a blue (B) image is selectively displayed per sub-frame period. Due to the red (R) image, the green (G) image, and the blue (B) image displayed by time division, the user visually identifies an image in multicolored display.

Figure 16:
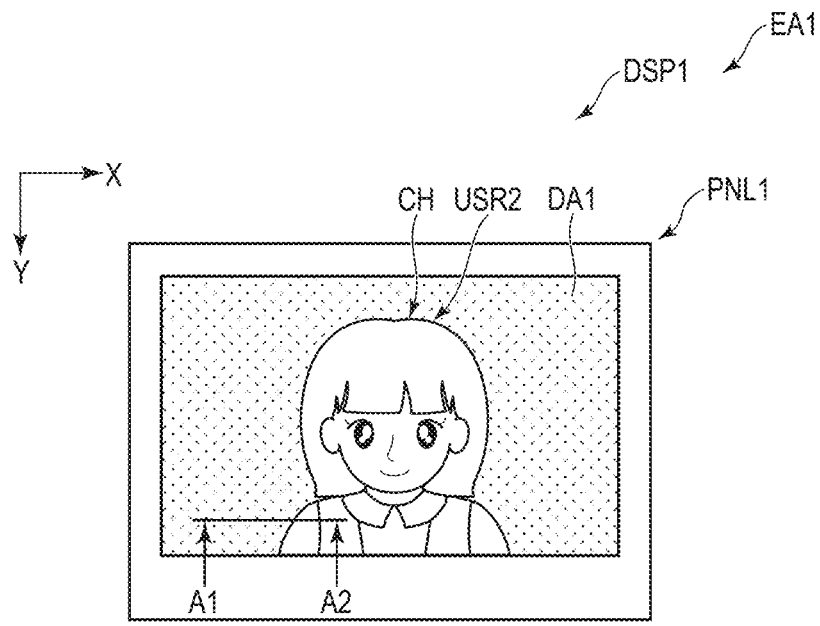
FIG. 16 is a plan view showing a partial configuration of the electronic apparatus according to the embodiment.

A usage example of an electronic apparatus EA will be now described. FIG. 16 is a plan view showing a partial configuration of the electronic apparatus EA according to the present embodiment. Referring to FIG. 16, the scattering voltage VB and the first transparent voltage VA1 have been applied to the liquid crystal layer LCY of the display panel PNL. Thus, an image is displayed in the display area DA of the display panel PNL.

Referring to FIG. 16, with the electronic apparatus EA1, the user USR1 is in an online meeting with the user USR2 displayed in the display area DA1 of the display panel PNL1. The user USR1 not illustrated can make eye contact with the user USR2 displayed in the display area DA1 or identify the gesture of the user USR2. Note that, for easy understanding, an exemplary online meeting in which only the users USR1 and USR2 participate will be given, but the present embodiment is not limited to this. As described, for example, with FIG. 7, the present embodiment can be applied to an online meeting in which a plurality of users participates.

The scattering voltage VB not less than a predetermined gradation voltage has been applied to each pixel PX in the area overlapping (displaying) an image CH of the user USR2. In addition, in the example, the first transparent voltage VA1 has been applied to each pixel PX not overlapping (not displaying) the area of the image CH of the user USR2. Note that the first transparent voltage VA1 is required to be a predetermined range of voltage near the range enabling gradation reproduction with gradation voltage.

In the area overlapping (displaying) the image CH of the user USR2 in the display area DA (liquid crystal layer LCY) of the display panel PNL, not only the illumination light from the light source unit LU but also ambient light is scattered. For this reason, the user USR1 has difficulty in visually identifying the camera CA through the display area DA.

Figure 17:
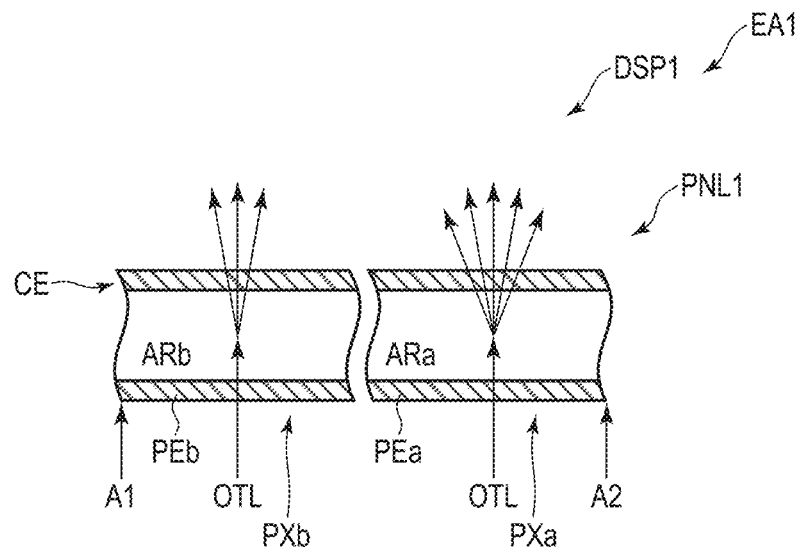
FIG. 17 is a sectional view showing the display panel taken along line A1-A2 of FIG. 16.

FIG. 17 is a sectional view showing the display panel PNL taken along line A1-A2 of FIG. 16. Referring to FIG. 17, parts necessary for description in the display panel PNL are only shown.

As shown in FIG. 17, the pixels PX of the display panel PNL include a pixel PXa and a pixel PXb. The pixel PXa includes a pixel electrode PEa and the pixel PXb includes a pixel electrode PEb.

The liquid crystal layer LCY (display function layer) includes a plurality of liquid crystal areas (also referred to as display function areas) AR. The liquid crystal layer LCY includes a liquid crystal area ARa, to which voltage is to be applied, between the pixel electrode PEa and the common electrode CE and a liquid crystal area ARb, to which voltage is to be applied, between the pixel electrode PEb and the common electrode CE. In the present embodiment, the liquid crystal area ARa is interposed between the pixel electrode PEa and the common electrode CE, and the liquid crystal area ARb is interposed between the pixel electrode PEb and the common electrode CE.

Voltage is applied across a pixel electrode PE corresponding to each of the liquid crystal areas AR among the pixel electrodes PE and the common electrode CE, so that the scattering voltage VB or the transparent voltage VA (first transparent voltage VA1) is selectively applied to each liquid crystal area AR.

The liquid crystal layer LCY (liquid crystal areas AR) scatters light that enters in a case where the scattering voltage VB is applied and retains the parallelism of light that enters in a case where the first transparent voltage VA1 is applied. The parallelism of the ambient light OTL that passes through each liquid crystal area AR at the time of application of the transparent voltage VA (first transparent voltage VA1) is higher than the parallelism of the ambient light OTL that passes through each liquid crystal area AR at the time of application of the scattering voltage VB. In addition, the degree of scattering of the ambient light OTL that passes through each liquid crystal area AR at the time of application of the scattering voltage VB is higher than the degree of scattering of the ambient light OTL that passes through each liquid crystal area AR at the time of application of the transparent voltage VA (first transparent voltage VA1).

Referring from FIG. 16 to FIG. 19, the liquid crystal area ARa is the area overlapping the image CH of the user USR2, and the liquid crystal area ARb is the area not overlapping the image CH of the user USR2. Referring to FIGS. 16 and 17, the scattering voltage VB is applied to the pixel PXa of the liquid crystal area ARa. In contrast, the first transparent voltage VA1 is applied to the pixel PXb of the liquid crystal area ARb.

Now, we focus on one frame period in the period in which an image is displayed in the display area DA. The controller CON applies voltage across each pixel electrode PE and the common electrode CE in a write period in one frame period. The scattering voltage VB or the transparent voltage (first transparent voltage VA1) is selectively applied to the liquid crystal areas AR. In the write period, the controller CON prohibits light emission with the light source unit LU.

The controller CON retains, in a light emission period being independent from the write period and following the write period, the liquid crystal areas AR to which the scattering voltage VB or the transparent voltage (first transparent voltage VA1) has been selectively applied. In the light emission period, the controller CON allows light emission with the light source unit LU, so that light is emitted to the liquid crystal layer LCY. The light emitted from the light source unit LU is scattered in a plurality of liquid crystal areas ARa to which the scattering voltage VB has been applied, among the liquid crystal areas AR. Thus, the controller CON can display an image in the display area DA. Note that, in the light emission period, the controller CON prohibits shooting with the camera CA.

The color of the image displayed in the display area DA (e.g., the color of the pixels PXa) is based on the color from the light source unit LU. For this reason, the controller CON can make the color of the display image a single color from the light source unit LU or a mixture of a plurality of colors from the light source unit LU. In addition, the entire image can be displayed in a single color or the image can be displayed partially in different colors.

The degree of scattering of light in the liquid crystal area ARa is higher than the degree of scattering of light in the liquid crystal area ARb. The liquid crystal area ARa is in the scattered state. For this reason, in a case where the background is viewed through the display panel PNL, a reduction can be made to the minimum of the visibility of the background through the image CH in the area overlapping the image CH of the user USR2.

In contrast, the parallelism of light passing through the liquid crystal area ARb is higher than the parallelism of light passing through the liquid crystal area ARa. The liquid crystal area ARb is in a first transparent state. The light is slightly scattered in the liquid crystal area ARb.

In a case where the background is viewed through the display panel PNL, the background through the display panel PNL can be blurred not overlapping the area of the image CH of the user USR2 (collocutor in the online meeting). Thus, a deterioration can be made in the visibility of the background not overlapping the area of the image CH of the user USR2. Therefore, the user USR1 visually identifies the image CH of the user USR2, easily.

Note that, in the present embodiment, the area overlapping (displaying) the image CH of the user USR2 and the area (background) not overlapping (not displaying) the area of the image CH of the user USR2 in the display area DA are also referred to as a first image area and a second image area, respectively.

Note that the voltage applied to the pixel PXb not overlapping the area of the image CH of the user USR2 may be identical to the second transparent voltage VA2. Thus, a transparent state where the background is not blurred can be provided not overlapping the area of the image CH of the user USR2. Alternatively, the scattering voltage VB may be applied to the liquid crystal area ARb to bring the liquid crystal area ARb into the scattered state.

Next, exemplary adoption of transparent drive (drive in a reset period) in which, for example, the voltage across a pixel electrode PE and the common electrode CE is made smaller than the lower limit in gradation, into a sequence of image display will be described. The adoption enables the camera CA to shoot the subject through the display panel PNL, more clearly. Note that the provision of the reset period enables an improvement in the visibility of the background through the display panel PNL.

Figure 18:
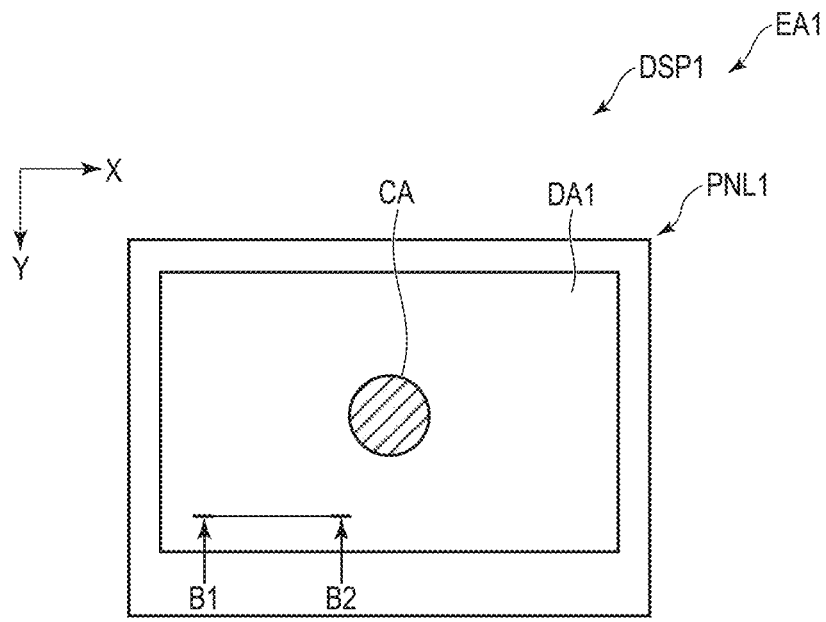
FIG. 18 is a plan view showing a partial configuration of the electronic apparatus according to the embodiment.

FIG. 18 is a plan view showing a partial configuration of the electronic apparatus EA according to the present embodiment. Referring to FIG. 18, the second transparent voltage VA2 has been applied to the liquid crystal layer LCY of the display panel PNL. Thus, the display area DA (liquid crystal layer LCY) of the display panel PNL is in a second transparent state. Referring to FIG. 18, the camera CA can be visually identified through the display panel PNL.

As shown in FIG. 18, in the reset period independent from the write period and the light emission period, the second transparent voltage VA2 has been applied to each pixel PX in the display area DA. Due to prompt switching among the write period, the light emission period, and the reset period, the line of sight of the user USR1 is directed to the display area DA of the display panel PNL even in the reset period. For this reason, the user USR1 can direct its line of sight to the camera CA, naturally. In the reset period, the display area DA (liquid crystal layer LCY) of the display panel PNL enables an enhancement in the parallelism of ambient light.

Figure 19:
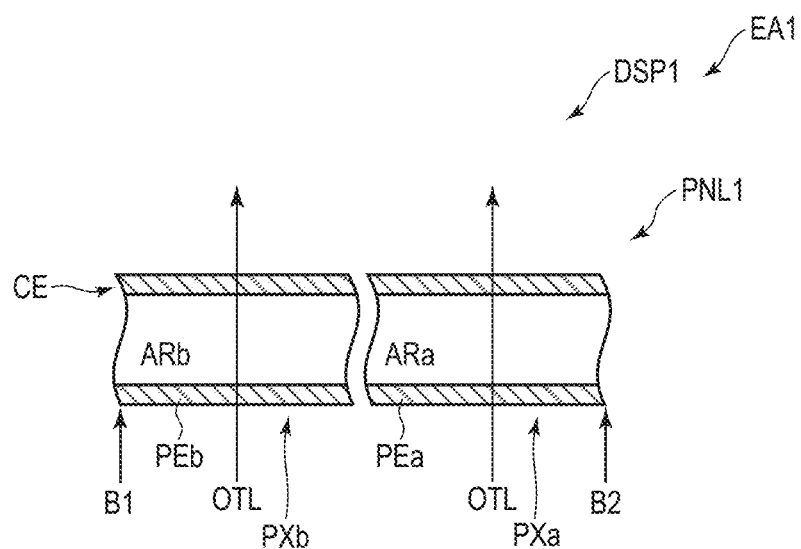
FIG. 19 is a sectional view showing the display panel taken along line B1-B2 of FIG. 18.

FIG. 19 is a sectional view showing the display panel PNL taken along line B1-B2 of FIG. 18. Referring to FIG. 19, parts necessary for description in the display panel PNL are only shown. As shown in FIG. 19, pixels PXa and PXb are identical to the pixels PXa and PXb in FIG. 17, respectively.

Voltage is applied across a pixel electrode PE corresponding to each of the liquid crystal areas AR among the pixel electrodes PE and the common electrode CE. The transparent voltage (second transparent voltage VA2) is applied to each liquid crystal area AR.

The liquid crystal layer LCY (liquid crystal areas AR) retains the parallelism of light that enters in a case where the second transparent voltage VA2 is applied. The parallelism of the ambient light OTL that passes through each liquid crystal area AR at the time of application of the second transparent voltage VA2 is higher than the parallelism of the ambient light OTL that passes through each liquid crystal area AR at the time of application of the first transparent voltage VA1. In addition, the degree of scattering of the ambient light OTL that passes through each liquid crystal area AR at the time of application of the second transparent voltage VA2 is lower than the degree of scattering of the ambient light OTL that passes through each liquid crystal area AR at the time of application of the first transparent voltage VA1.

Note that the first transparent voltage VA1 and the second transparent voltage VA2 may be identical to each other. In that case, the parallelism of the ambient light OTL that passes through each liquid crystal area AR at the time of application of the second transparent voltage VA2 is identical to the parallelism of the ambient light OTL that passes through each liquid crystal area AR at the time of application of the first transparent voltage VA1.

As shown in FIGS. 18 and 19, in the reset period, the second transparent voltage VA2 has been applied to the liquid crystal areas AR including the liquid crystal area ARa corresponding to the pixel PXa and the liquid crystal area ARb corresponding to the pixel PXb. In the present embodiment, reverse mode polymer dispersed liquid crystal is used for the liquid crystal layer LCY. The second transparent voltage VA2 is lower than the first transparent voltage VA1. Note that, in a case where normal mode polymer dispersed liquid crystal is used for the liquid crystal layer LCY, the second transparent voltage VA2 is higher than the first transparent voltage VA1.

For example, as described above, the first transparent voltage VA1 may be a range of voltage in which the degree of scattering is not less than 10% and not more than 50%, and the second transparent voltage VA2 may be a range of voltage in which the degree of scattering is less than 10%. Note that the scattering voltage VB is required to be a voltage at which the degree of scattering is 100%. That is, the first transparent voltage VA1 may be a range of voltage in which the transparency of the liquid crystal layer LCY is larger than 50% and smaller than 90%, the second transparent voltage VA2 may be a range of voltage in which the transparency is not less than 90%, and the scattering voltage VB may be a voltage at which the transparency is 0%.

Now, we focus on one frame period in the period in which an image is displayed in the display area DA. In the reset period, the controller CON applies voltage across each pixel electrode PE and the common electrode CE. Application of the transparent voltage (second transparent voltage VA2) to the liquid crystal areas AR brings the display area DA into the transparent state. At this time, the controller CON prohibits light emission with the light source unit LU. The liquid crystal areas AR including the liquid crystal area ARa and the liquid crystal area ARb are in the second transparent state.

In the periods except the light emission period (write period and reset period), the controller CON prohibits light emission with the light source unit LU. The controller CON sets, as a shooting period, a period independent from the light emission period. In the shooting period, while prohibiting light emission with the light source unit LU, the controller CON applies the transparent voltage (first transparent voltage VA1 or second transparent voltage VA2) to the liquid crystal areas AR, to make the display area DA transparent. At this time, the ambient light OTL passes through the liquid crystal areas AR. Shooting with the camera CA is allowed, so that the camera CA captures the ambient light OTL having passed through the display area DA.

Thus, an event that the camera CA captures illumination light from the light source unit LU can be avoided. Setting the shooting period into the reset period enables the camera CA to shoot the subject through the display panel PNL, more clearly.

FIG. 23 is a timing chart for describing an exemplary operation of the electronic apparatus EA. As shown in FIG. 23, one frame period Pf corresponds, for example, to the period from a drop to a re-drop in a vertical synchronization signal Vsync. For example, in a case where the display device DSP is driven at 60 Hz, one frame period Pf is approximately 16.7 ms.

One frame period Pf includes a first sub-frame period PsfR, a second sub-frame period PsfG, and a third sub-frame period PsfB. The first sub-frame period PsfR, the second sub-frame period PsfG, and the third sub-frame period PsfB are independent from each other and are continuous in this order. The first sub-frame period PsfR, the second sub-frame period PsfG, and the third sub-frame period PsfB are each referred to as a sub-frame period Psf unless otherwise distinguished. The order of the sub-frame periods Psf is not limited to the above order and thus may be changed.

The sub-frame periods Psf each include a write period Pw, a light emission period Ph, and a reset period Pr. The write period Pw, the light emission period Ph, and the reset period Pr are each an independent period, and are continuous in this order. Note that the reset period Pr may be followed by the write period Pw.

In the write period Pw in the first sub-frame period PsfR, the gate driver GD applies a high-level gate signal VG to the scanning lines GL1 to GLn in order. Furthermore, during application of the gate signal VG, the source driver SD applies, to the signal lines SL1 to SLm, the signal line voltage Vsig corresponding to red sub-frame data. More specifically, the following operation is repeated: signal line voltages Vsig at gradations corresponding one-to-one to the pixels PX of a scanning line GL supplied with the gate signal VG are applied one-to-one to the signal lines SL1 to SLm at a time.

Such signal line voltages Vsig are applied one-to-one to the pixel electrodes PE of the pixels PX corresponding to the selected scanning line GL, through the switching elements SW. After that, the switching elements SW are each switched to a non-conductive state, so that the potential of the pixel electrode PE is retained. After that, the next scanning line GL is selected and then similar drive is performed in sequence. The operation is repeated from the scanning line GL1 to the scanning line GLn.

Note that, in the present embodiment, the polarity of the common voltage Vcom for driving the common electrode CE is inverted per sub-frame period Psf. In the example shown in FIG. 23, the common voltage Vcom changes from the low level (L) to the high level (H) in the reset period Pr in the first sub-frame period PsfR. The common voltage Vcom changes from the high level (H) to the low level (L) in the reset period Pr in the second sub-frame period PsfG. The common voltage Vcom changes from the low level (L) to the high level (H) in the reset period Pr in the third sub-frame period PsfB. The high level (H) is required to be, for example, 16 V described above and the low level (L) is required to be, for example, 0 V described above.

Due to the above operation, the voltage corresponding to the red sub-frame data is written in between the pixel electrode PE of each pixel PX and the common electrode CE. In each sub-frame period Psf, the signal line voltage Vsig supplied to each of the pixel electrodes PE through the signal lines SL1 to SLm is different in polarity from the common voltage Vcom of the common electrode CE or is the reference voltage Vsig-c.

Therefore, the absolute value of the voltage written in each pixel PX in the display area DA is not less than 8 V and not more than 16 V. As above, in the write period Pw, the controller CON applies, to the liquid crystal areas AR, the scattering voltage VB or the first transparent voltage VA1, selectively.

The light emission period Ph in the first sub-frame period PsfR corresponds to the period from completion of write to all the pixels PX to the reset period Pr. In the light emission period Ph, the controller CON retains the liquid crystal areas AR to which the scattering voltage VB or the first transparent voltage VA1 has been selectively applied. In the light emission period Ph, the controller CON allows emission of the first color light with the light-emitting element LSR, prohibits emission of the second color light with the light-emitting element LSG, and prohibits emission of the third color light with the light-emitting element LSB.

Thus, the controller CON can cause the first color light emitted from the light-emitting element LSR to be scattered in the liquid crystal areas AR to which the scattering voltage VB is applied in the write period Pw in the first sub-frame period PsfR. Therefore, a red image is displayed in the display area DA.

Note that the light-emitting element LSR lights up, with no margin period, after completion of write to all the pixels PX. Note that, after completion of write to all the pixels PX, the light-emitting element LSR may light up with a margin period. Thus, for example, a liquid crystal response period can be secured.

In the reset period Pr in the first sub-frame period PsfR, transparent drive is performed. That is, the gate driver GD applies a high-level gate signal VG to the scanning lines GL1 to GLn, simultaneously. Furthermore, during application of the gate signal VG, the source driver SD applies, to each of the signal lines SL1 to SLm, for example, the signal line voltage Vsig identical in value to the common voltage Vcom. Due to such an operation, the second transparent voltage VA2 is applied to the liquid crystal areas AR.

The pixel electrode PE of each pixel PX electrically remains in a floating state, after the gate signal VG is applied to the corresponding scanning line GL, until the next gate signal VG is applied to the scanning line GL. Therefore, regarding a pixel PX (liquid crystal area AR) having the second transparent voltage VA2 written therein, the second transparent voltage VA2 is retained until the next gate signal VG is applied to the corresponding scanning line GL.

Regarding the pixel PX having the second transparent voltage VA2 written therein, the liquid crystal area AR is in the second transparent state. In the reset period Pr, the light-emitting elements LSR, LSG, and LSB are all off. Note that, desirably, the light-emitting elements LSR, LSG, and LSB are off in the reset period Pr, but may light up in the reset period Pr.

The signal line voltage Vsig applied to each of the signal lines SL1 to SLm in the reset period Pr is not necessarily identical to the common voltage Vcom. The signal line voltage Vsig is required to be a value for achievement of the second transparent voltage VA2.

The respective operations in the second sub-frame period PsfG and the third sub-frame period PsfB are similar to that in the first sub-frame period PsfR. That is, the second sub-frame period PsfG includes a write period Pw, a light emission period Ph, and a reset period Pr. In the write period Pw, the voltage corresponding to green sub-frame data is written in each pixel PX in the display area DA.

In the light emission period Ph in the second sub-frame period PsfG, the controller CON retains the liquid crystal areas AR to which the scattering voltage VB or the first transparent voltage VA1 has been selectively applied. The controller CON allows emission of the second color light with the light-emitting element LSG, prohibits emission of the first color light with the light-emitting element LSR, and prohibits emission of the third color light with the light-emitting element LSB.

Thus, the controller CON can cause the second color light emitted from the light-emitting element LSG to be scattered in the liquid crystal areas AR to which the scattering voltage VB is applied in the write period Pw in the second sub-frame period PsfG. Therefore, a green image is displayed in the display area DA.

In addition, the third sub-frame period PsfB includes a write period Pw, a light emission period Ph, and a reset period Pr. In the write period Pw, the voltage corresponding to blue sub-frame data is written in each pixel PX in the display area DA.

In the light emission period Ph in the third sub-frame period PsfB, the controller CON retains the liquid crystal areas AR to which the scattering voltage VB or the first transparent voltage VA1 has been selectively applied. The controller CON allows emission of the third color light with the light-emitting element LSB, prohibits emission of the first color light with the light-emitting element LSR, and prohibits emission of the second color light with the light-emitting element LSG.

Thus, the controller CON can cause the third color light emitted from the light-emitting element LSB to be scattered in the liquid crystal areas AR to which the scattering voltage VB is applied in the write period Pw in the third sub-frame period PsfB. Therefore, a blue image is displayed in the display area DA.

Due to a mixture of the red image, the green image, and the blue image displayed by time division in the first sub-frame period PsfR, the second sub-frame period PsfG, and the third sub-frame period PsfB, the user visually identifies an image in multicolored display.

A shooting period Pe is set in a write period Pw and a reset period Pr. In the present embodiment, the shooting period Pe is set in a plurality of write periods Pw and a plurality of reset periods Pr in one frame period Pf. More particularly, the shooting period Pe is set in all the write periods Pw and all the reset periods Pr in one frame period Pf.

In the present embodiment, the camera CA can shoot the subject in both of the write period Pw and the reset period Pr. Thus, an event that a reduction is made in the amount of exposure can be avoided. In addition, since the shooting period Pe can be set in the reset period Pr, the camera CA can shoot the subject with the display area DA having it transparency highest. For example, the camera CA can shoot the subject through the display panel PNL, more clearly.

In addition, in the reset period Pr, the second transparent voltage VA2 is applied to each liquid crystal area AR. Single-time provision of such a reset period Pr per single sub-frame period Psf enables an increase in the period in which the transparency of the display area DA is high. Note that the reset period Pr may be provided a single time per single frame period Pf or may be provided a single time per frame periods. From a viewpoint of inhibition of display failure, such as image burning, preferably, the frequency of reset is higher.

At the time of adjustment of the reset period Pr, not only the period in which the electric potential of each pixel electrode PE and the electric potential of the common electrode CE each transition to a desired value but also the transparency of the display area DA may be taken into consideration.

A larger ratio of the reset period Pr to one frame period Pf enables an increase in the period in which the transparency of the display area DA is high. However, an increase in the reset period Pr may cause a deterioration in the visibility of the image. Preferably, the length of the reset period Pr is determined in consideration of the above.

For example, the first sub-frame period PsfR, the second sub-frame period PsfG, and the third sub-frame period PsfB can be made identical in length. The color chromaticity of the display image may be adjusted by making the first sub-frame period PsfR, the second sub-frame period PsfG, and the third sub-frame period PsfB different in ratio.

According to the present embodiment, provided can be an electronic apparatus enabling users to keep eye contact with each other in an online meeting. Even in a case where the collocutor displayed on the display panel of the electronic apparatus changes its posture, the line of sight of the collocutor having changed its posture and the line of sight of the user who uses the display panel can be matched together. Thus, an improvement can be made in the quality of communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a display panel including a display area;
    a camera opposed to the display area of the display panel; and
    a controller that controls drive of the display panel and drive of the camera,
    the controller is configured to
    compare a position of an image of an eye of a user displayed in the display area and a position of the camera,
    move, in a case where difference is present between the position of the image of the eye of the user and the position of the camera, an image of the user such that the position of the image of the eye of the user is superposed on the position of the camera,
    compare a position of an image of an eye of a user among the users and the position of the camera, and
    move, in a case where difference is present between the position of the image of the eye of the user among the users and the position of the camera, an image of the user among the users such that the position of the image of the eye of the user among the users is superposed on the position of the camera, wherein
    an image of a plurality of users is displayed in the display area.

2. The electronic apparatus according to claim 1, wherein the user among the users is determined based on an input from a user of the electronic apparatus.

3. The electronic apparatus according to claim 1, wherein the controller determines the user among the users, based on a change in the image of the user among the users.

4. The electronic apparatus according to claim 1, further comprising an eye tracking element, wherein the eye tracking element detects a line of sight of a user of the electronic apparatus, and the controller determines the user among the users, based on an information detected by the eye tracking element.

* * * * *